United States Patent [19]
Rodriguez

[11] Patent Number: 5,585,944
[45] Date of Patent: Dec. 17, 1996

[54] METHOD FOR COMPRESSING AND DECOMPRESSING IMAGES BY SUBDIVIDING PIXEL COLOR DISTRIBUTIONS

[75] Inventor: Arturo A. Rodriguez, Belmont, Calif.

[73] Assignee: Kaleida Labs, Inc., Mountain View, Calif.

[21] Appl. No.: 241,047

[22] Filed: May 10, 1994

[51] Int. Cl.[6] .............................. H04N 1/41; H04N 1/46
[52] U.S. Cl. ..................... 358/500; 358/426; 358/539; 358/520; 382/162; 382/164; 382/166
[58] Field of Search ..................... 358/500, 426, 358/432, 433, 430, 261.1, 261.2, 261.3, 520, 539, 515; 382/232, 239, 243, 162, 164, 166, 240; 348/404, 405, 384, 420; H04N 1/46, 1/41, 1/415, 1/417, 1/419; G03F 3/08

[56] References Cited

U.S. PATENT DOCUMENTS

| | | | |
|---|---|---|---|
| 4,980,764 | 12/1990 | Henot | 358/133 |
| 5,046,119 | 9/1991 | Hoffert et al. | |
| 5,228,098 | 7/1993 | Crinon et al. | 382/240 |
| 5,319,793 | 6/1994 | Hancock et al. | 395/800 |
| 5,392,072 | 2/1995 | Rodriguez et al. | 348/405 |
| 5,418,714 | 5/1995 | Sarver | 364/413.13 |

FOREIGN PATENT DOCUMENTS

| | | |
|---|---|---|
| 2628864 | 9/1989 | France. |
| 6124343 | 5/1994 | Japan. |

*Primary Examiner*—Kim Yen Vu
*Assistant Examiner*—Kimberly A. Williams
*Attorney, Agent, or Firm*—Irell & Manella LLP

[57] ABSTRACT

The present invention provides methods and apparatus for representing visual images in compressed digital form. A series of digital images is provided to a random access memory and compressed one frame at a time. The compressor of the present invention divides a frame into a predefined number of blocks. Each block is tested to determine whether the block has a homogeneous color distribution. If the block has a homogeneous color distribution as defined by a selected homogeneity test, each pixel in that block is encoded with a single color value. If the block does not have a homogeneous color distribution, the block is split into two distributions, one distribution with a greater luminance than the average luminance of the first distribution and one distribution with a smaller luminance than the average luminance of the first distribution. These distributions are separately tested for homogeneity and the same process is repeated until the region has been resolved into homogeneous distributions. Distributions are then merged to check whether the merged distribution is homogeneous. After merging, pixels in homogeneous distributions are encoded as a single color.

27 Claims, 18 Drawing Sheets

FIG. 6
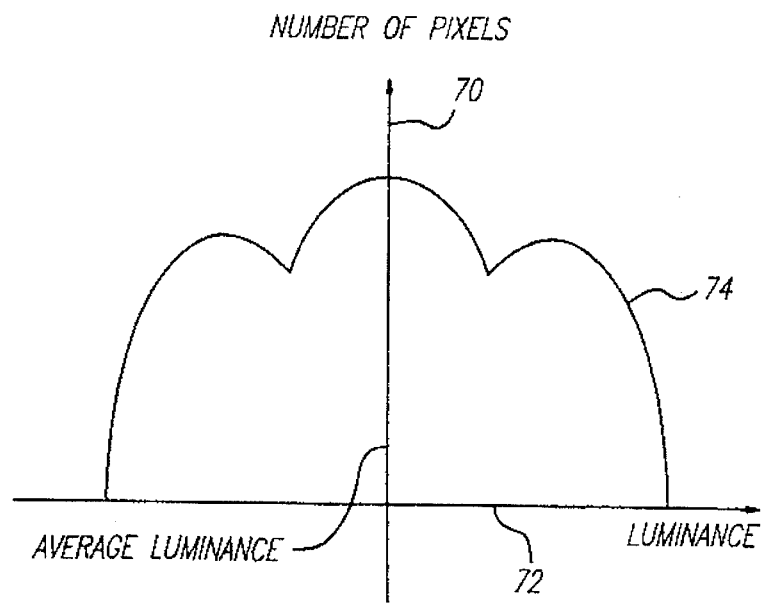
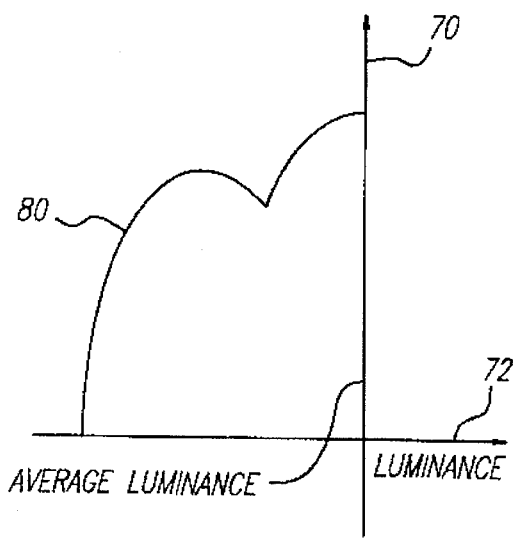
FIG. 7a
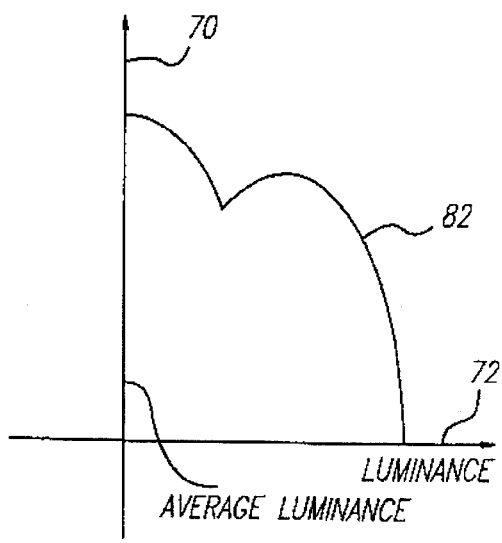
FIG. 7b

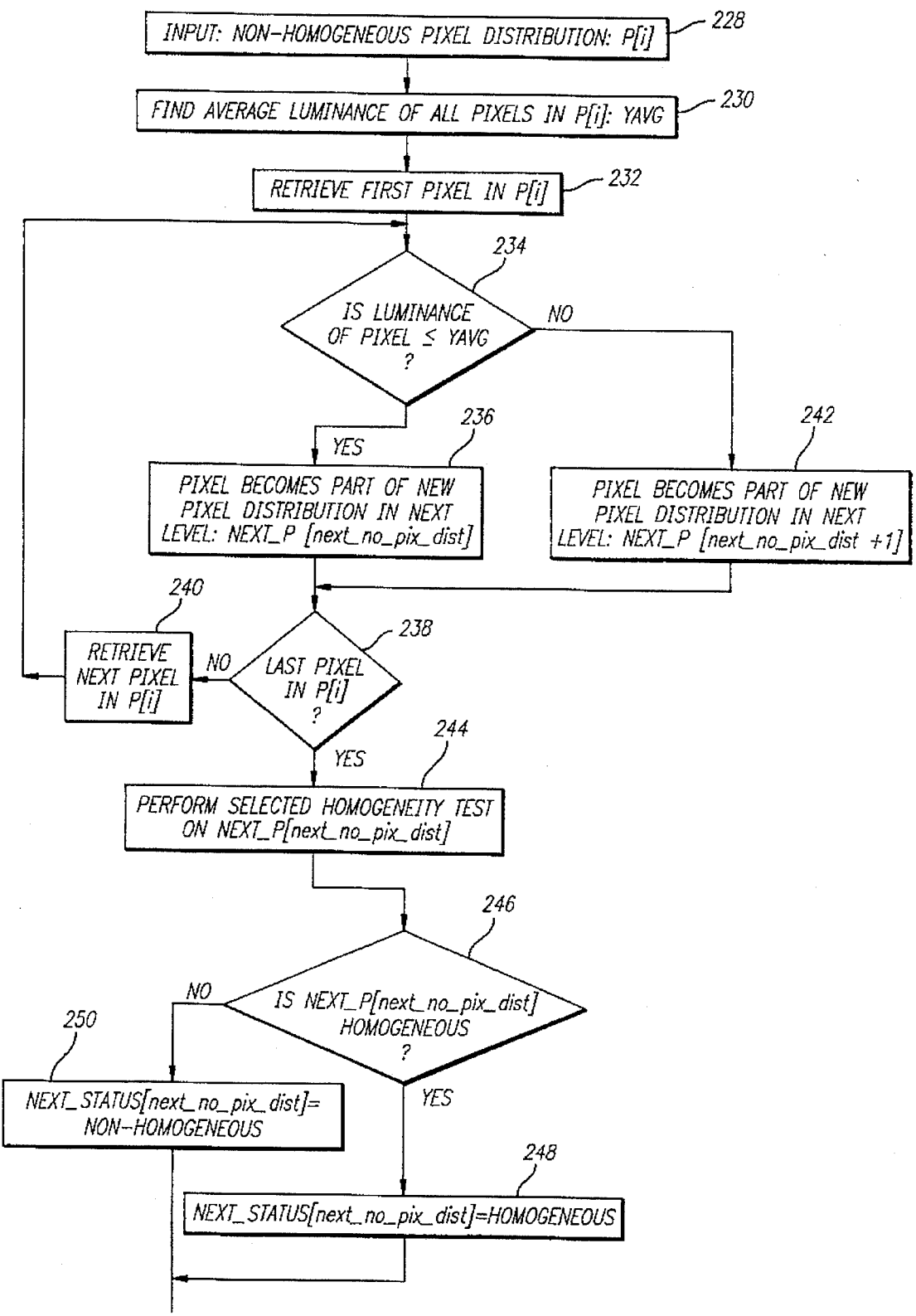
FIG. 12(b)1

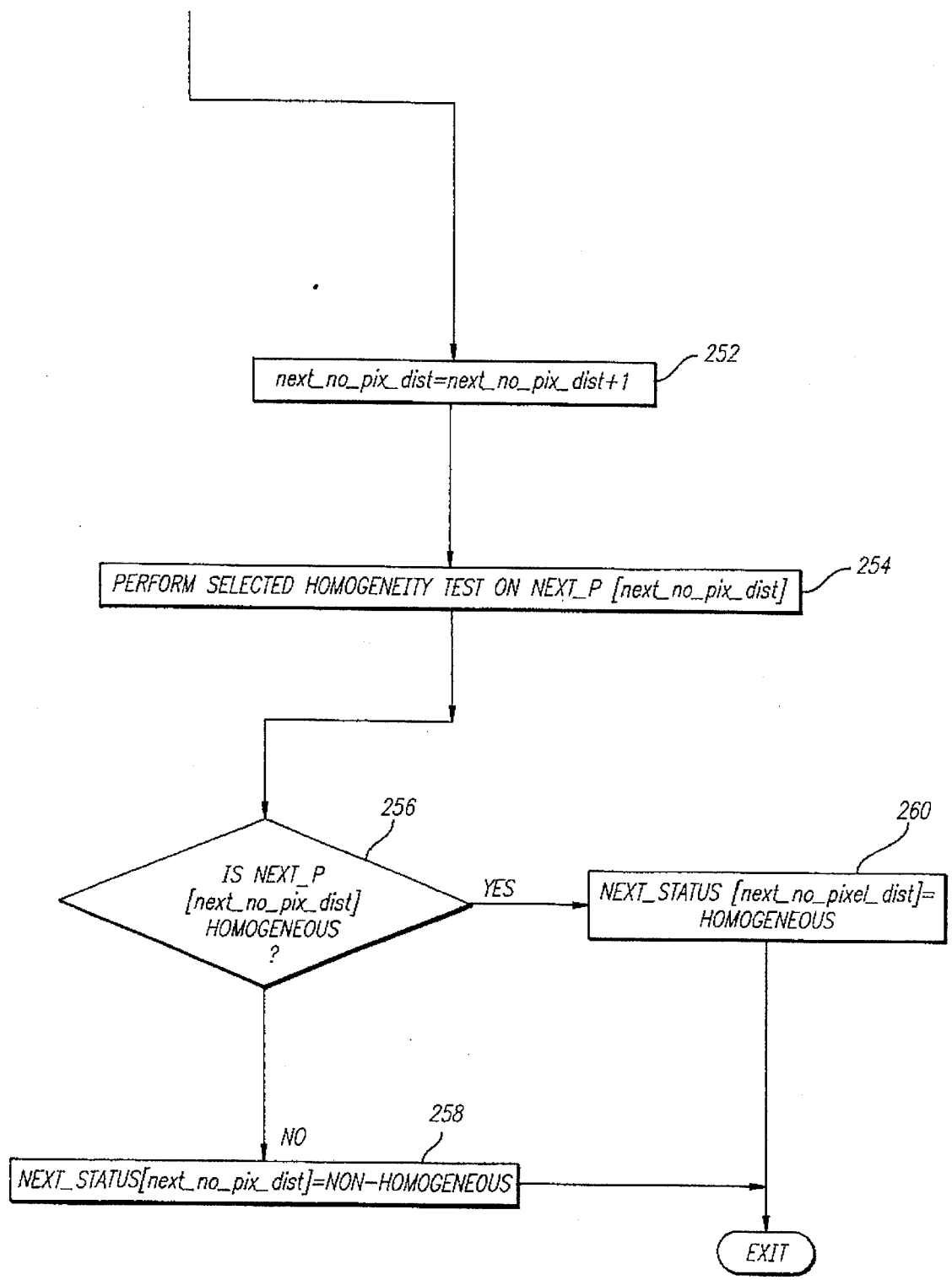
FIG. 12(b)2

METHOD FOR COMPRESSING AND DECOMPRESSING IMAGES BY SUBDIVIDING PIXEL COLOR DISTRIBUTIONS

BACKGROUND OF THE INVENTION

1. Field of the Invention

The method and apparatus of the present invention relates to the storage, display and playback of digitized visual images, and more particularly, relates to an apparatus and method for compressing and decompressing digitized visual images.

2. Art Background

Many digital devices, such as computers and video cassette recorders (VCR), are used to store and display visual images, for example, in the form of movies. Digitized visual images require large storage capacities. One frame of a movie requires 153,600 (320*240×2) bytes if represented in decompressed form for RGB 16 display modes. At 15 frames per second, one second of a movie requires 2,304,000 bytes of storage. Since the amount of storage in digital devices is limited, and since digital devices have limited internal bandwidth, there is a need to represent digitized images in compressed form. The proliferation of digital video in multimedia applications has intensified this need.

One prior art technique to compress digitized monochrome visual images is known as Block Truncation Coding (BTC), first described by Delp and Mitchell. See, E. J. Delp and O. R. Mitchell, "Image Compression Using Block Truncation Coding," *IEEE Transactions on Communications*, Vol. COM-27, No. 9, pp. 1335–1342, September 1979 (hereinafter the "Delp Method"). This method takes advantage of the human eye's tendency to perceive the average value of fine detail within a small area when viewing that small area from a distance. If the fine detail is represented with information on that preserves the average and standard deviation of the original information, the human eye will not perceive any information loss.

BTC has been extended to color images. The general color BTC method includes the following steps:

1. Decompose the image into non-overlapping n×m blocks.
2. For each block, find the mean luminance value, $Y_{avg}$, and perform steps 3 to 6.
3. For all pixels in a block whose luminance values are less than or equal to $Y_{avg}$, find the average color $C_{low}$.
4. For all pixels in a block whose luminance values are greater than $Y_{avg}$, find the average color $C_{high}$.
5. Construct a binary pattern for each block by representing pixels associated with $C_{low}$ as a "0" in the binary pattern, and pixels associated with $C_{high}$ as a 1.
6. Code the block with its two representative color values and the binary pattern, a "0" or a "1" for each pixel.

See, G. Campbell, et al., "Two Bit/Pixel Full Color Encoding," in ACM Computer Graphics, Vol. 20, No. 4, pp. 215–223, Dallas, August 1986). Thus, each pixel within a block is represented as one of two colors. Space is saved because the block is encoded with two colors, four bytes for two RGB 16 colors, to signify the value of the binary pattern plus the 1 bit per pixel in the binary pattern. For example, a block of 4×4 pixels is encoded with four bytes to represent the two colors plus 16 bits, one for each pixel in the block. Thus, the block is encoded with a total of 48 bits or 6 bytes.

Without BTC, each pixel is encoded with 16 bits required to represent its RGB 16 color value, a total of 256 bits for a block of 4×4 pixels. Thus, BTC results in a compression ratio of 256/48 or 16:3 for a block of 4×4 pixels.

The methods that decompose an image into blocks, encode the block as two representative values and encode the pixels in the block as a binary pattern are generally referred to as Binary Pattern Image Coding (BPIC). The block size that can be employed using BPIC depends upon the viewing distance to the display monitor, the pixel resolution and physical dimensions of the display monitor. For instance, see, D. Chen and A. C. Bovik, "Visual Pattern Image Coding," *IEEE Transactions on Communications*, Vol. COM-38, No. 12, pp. 2136–2146, December 1990. Since neither the color distribution of the images to be compressed nor the extent of information variation with each block are usually known before compression occurs, the block size required to maintain an acceptable level of information is difficult to estimate.

An example of a variation of BPIC encoding is disclosed in U.S. patent application Ser. No. 07/965,580 assigned to IBM by Arturo Rodriguez, Mark Pietras and Steven Hancock, filed October, 1992 and titled "HYBRID VIDEO COMPRESSION SYSTEM AND METHOD CAPABLE OF SOFTWARE-ONLY DECOMPRESSION IN SELECTED MULTILMEDIA SYSTEMS." The 07/965,580 application divides an image into regions and examines each region with a homogeneity test. If the region is homogeneous, it is encoded as one color. If the region is not homogeneous, the region is either encoded with BPIC or is divided into quadrants and the quadrants are encoded as homogeneous regions or with BPIC.

Since the method disclosed in the Ser. No. 07/965,580 patent application does not decompose a block beyond quadrants, it suffers from the same limitations as other non-recursive (BPIC) methods. Specifically, since neither the color distribution of the images to be compressed nor the extent of information variation with each block are usually known before compression occurs, the block or quadrant size that is required to maintain an acceptable level of information is difficult to estimate. Ideally, it is desirable to select the block size adaptively according to the information content of the local image region.

Roy and Nasarabadi suggested the use of a method that begins with large blocks, and employs the BTC technique recursively on smaller and smaller blocks by decomposing the block into quadrants, until an appropriate resolution of low information variation is found. See, J. U. Roy and N. M. Nasarabadi, "Hierarchical Block Truncation Coding," Optical Engineering, Vol. 30, No. 5, pp. 551–556.

Kamel uses a similar method, using an interval, $[Y_{avg}-t, Y_{avg}+t]$, around the average luminance value of the block to find the best threshold value that minimizes the color mean-square error. See, M. Kamel, C. T. Sun, and L. Guan, "Image Compression By Variable Block Truncation Coding With Optimal Threshold," IEEE Trans. on Signal Processing, Vol. 39, No. 1, pp. 208–212, January 1991.

Recursive block decomposition results in superior compression than non-recursive methods. By adaptively selecting the minimum number of colors required to represent the block, the image may initially be divided into arbitrarily large regions. Encoding a large homogeneous region as one color results in greater compression than unneccessarily encoding the same large region as a set of smaller regions with the same color since each region must be encoded with that color, which occupies a fixed number of bytes. For example, if a large region is represented as one color, the region is encoded with a two byte color value. If the same region is encoded as 4 regions, each region must be encoded with the two byte color. Thus, in this example, representing the large region as one color saves 6 bytes.

Non-recursive methods such as that described in the Ser. No. 07/965,580 application can not encode arbitrarily large regions since, as previously described, the regions into which the image is to be divided must be chosen to be sufficiently small to avoid unacceptable information loss. For an arbitrary image, this choice may not prove optimal since the image may contain single color regions larger than the chosen block size. By dividing these single color regions into smaller regions due to the initial choice of region size, non-recursive methods result in sub-optimal compression.

Although the techniques that recursively divide the image into smaller and smaller blocks result in greater compression than non-recursive methods, the prior art recursive methods have side effects that tend to reduce the quality of the picture. Dividing up the picture into smaller and smaller blocks imposes an artificial block structure on the image and the decompressed image thus tend to appear as if an artificial structure has been imposed upon it.

As will be described, the method and apparatus of the present invention does not impose an artificial structure on an image. The method allows arbitrary shaped objects within a block to retain their original boundaries instead of superimposing the quadrant decomposition structure of the previous suggested approaches. The method of the current invention thus tends to retain high image quality because the appropriate use of a single color is validated.

To validate the appropriateness of encoding a distribution as a single color, the method of the present invention employs a homogeneity test such as that disclosed in the Ser. No. 07/965,580 patent application. As previously described, the method disclosed in the Ser. No. 07/965,580 patent application divides an image into regions and examines each region with a homogeneity test. If the region is homogeneous, it is encoded as one color. If the region is not homogeneous, the region is either encoded with BPIC or is divided into quadrants and the quadrants are encoded as homogeneous regions or with BPIC.

Unlike the method disclosed in the Ser. No. 07/965,580 patent application, the method and apparatus of the present invention recursively employs a homogeneity test to resolve a block into a series of homogeneous distributions. As will be disclosed, the method and apparatus of the present invention decomposes frames by splitting pixel distributions by luminance characteristics, unlike prior art techniques which split images recursively into smaller and smaller blocks. Thus, as previously stated, the method and apparatus of the present invention does not impose an artificial structure on the image to be compressed, and thus significantly enhances the quality of the image when decompressed.

Apart from BPIC techniques, another suggested compression technique is based on representing groups of pixels by separate luminance and chrominance values for the group. The International Radio Consultative Committee (CCIR) has prescribed a particular coding methodology for this method. Successive two by two pixel regions of a digitized frame are encoded using an individual one byte luminance value for each pixel, and two bytes of representative color difference (chrominance) values for the four pixel region. Thus, instead of representing the four pixels as 12 bytes, 3 bytes per pixel for RGB24 display modes, the four pixels are represented as 6 bytes for a compression ratio of 50%. For an effective system to convert this compressed signal back to original RGB24 display data, see U.S. Pat. No. 5,262,847, issued Nov. 16, 1993 to Arturo Rodriguez et al.

Thus, there is a need for a compression method that achieves high compression ratios while simultaneously reducing the introduction of distortion in the compressed image. As will be described more fully below, the method and apparatus of the present invention will typically result in a much higher compression ratio than the CCIR encoding methodology.

As will be described, the method and apparatus of the present invention retains the benefits of recursive BPIC techniques without imposing an artificial structure on images. Thus, the method and apparatus of the present invention results in a combination of better image quality, better compression, low complexity, while simultaneously retaining ease of decompression.

SUMMARY OF THE INVENTION

The present invention provides methods and apparatus for representing color or monochrome visual images in compressed digital form. The methods allow rapid decompression while simultaneously retaining higher image quality than traditional BPIC methods. In accordance with the present invention, a visual image or a series of related visual images, such as a sequence of frames in a movie, is stored in digital or analog form and is provided to a compressor of the present invention. A series of digital images is provided to a random access memory (RAM) and compressed by the central processing unit (CPU) of the computer one frame at a time. A decompressor, following the encoding rules of the compressor, decompresses one frame at a time and provides the decompressed frame to the video RAM of a viewing device, such as a cathode ray tube (CRT).

The compressor of the present invention divides a frame into a predefined number of arbitrary sized non-overlapping contiguous regions, which may be simple blocks. Each block is tested to determine whether the block has a homogeneous color distribution. If the block has a homogeneous color distribution as defined by a selected homogeneity test, each pixel in that block is represented as a single color and only one color is needed to encode the block. If the block does not have a homogeneous color distribution, the block is split into two distributions, P(high) and P(low), where P(high) is that part of the first distribution with a greater luminance than the average luminance of the first distribution, $Y_{avg}$, and P(low) is that part of the first distribution with an equal or smaller luminance than $Y_{avg}$. P(high) and P(low) are separately tested for homogeneity and the same process is applied recursively to each until the region has been resolved into homogeneous pixel distributions.

The compressor also ensures that homogeneous distributions that were split during the splitting process are merged. For example, if a distribution is split into distributions P(high) and P(low), these distributions may be further split into distributions P(high, high), P(high, low), P(low, high) and P(low, low). The compressor checks if P(low, high) merged with P(high, low) results in a homogeneous distribution. If so, the merged distribution is encoded as a single color.

Each homogeneous distribution within a block is encoded as a single color and a different binary code representing each color is assigned to each homogeneous distribution. For example, if a block contains two homogenous color distributions, red and black, the color red may be assigned the binary code "0" and the color black the binary code "1".

To increase the compression ratio, the compressor uses frame differencing techniques to take advantage of redundancy between successive frames.

Following the rules of the compressor, a decompressor of the present invention reconstructs the color of each pixel. Continuing with the above example, if the color red is assigned the binary code "0" and the color black the binary code "1", the decompressor substitutes the full color value for red, two bytes for RGB 16 display modes, for each pixel encoded as a "0" and substitutes the color black for each pixel encoded as a "1." The decompressor associates colors with their corresponding patterns by following the same rules the compressor uses to assign patterns to colors.

BRIEF DESCRIPTION OF THE DRAWINGS

FIG. 6 illustrates a representative luminance distribution for a non-homogeneous block. FIGS. 7a and 7b illustrate the division of the distribution of FIG. 6 into two separate distributions.

FIGS. 12a through 12h are a flow chart representing the method of the present invention.

NOTATION AND NOMENCLATURE

Figure 1:
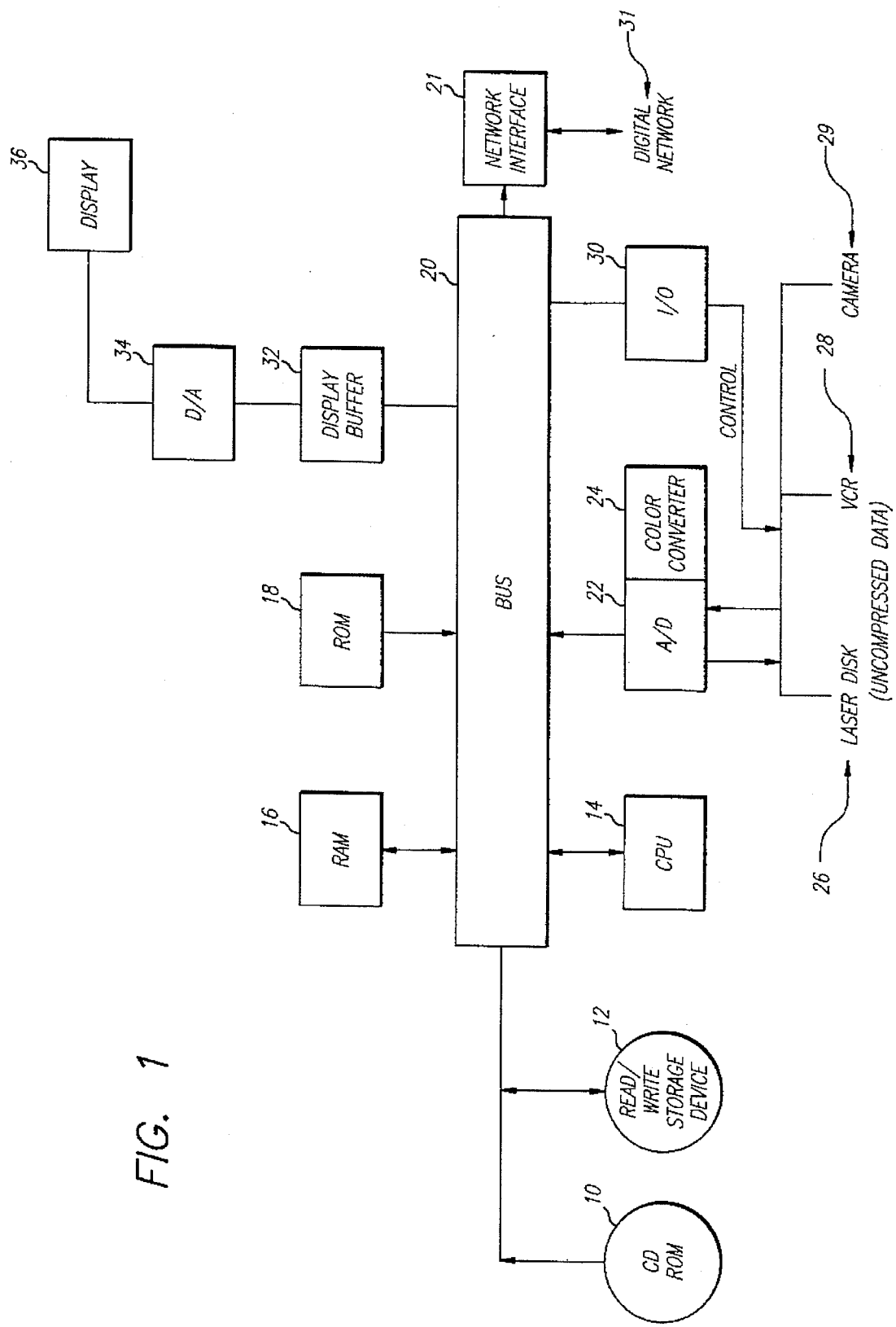
FIG. 1 is an overview of a system incorporating the teachings of the present inventor for compressing and storing digital images and decompressing and displaying the original images.

The detailed descriptions which follow are presented largely in terms of algorithms and symbolic representations of operations on data bits within a computer memory. These descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar digital devices. In all cases there should be borne in mind the distinction between the method operations in operating a computer and the method of computation itself. The present invention relates to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION OF THE INVENTION

In the following description, numerous specific details are set forth, such as the system in which compression and decompression is to occur, the division of a visual image into blocks, exemplary shapes of pixel distributions and the encoding of pixel distributions. However, it will be apparent to one skilled in the art that the present invention may be practiced without these specific details. In other instances, well known circuits and structures are not described in detail in order not to obscure the present invention unnecessarily.

FIG. 1 illustrates one exemplary system for compressing digital data, storing the compressed data, and regenerating the original data according to the present invention. Shown in FIG. 1 is a central processing unit (CPU) 14, random access memory (RAM) 16, a read/write storage device 12, a read only memory (ROM) 18, a network interface device 21, a display buffer 32, an input/output device 30 and a source of decompressed data, a laser disk 26, a video cassette recorder (VCR) 28, or a camera 29. As shown, these elements communicate with each other over a bus 20. The decompressed data is provided by the laser disc player 26, the VCR 28, the camera 29, or other device through control commands exercised by the input/output device 30. The analog signal from the laser disk player 26, the VCR 28 or the camera 29 is provided to an analog to digital (A/D) converter 22, which converts the analog image into a digital representation which is color converted to the desired color format (e.g., RGB 16) by color converter 24. Alternatively, if a color converter circuit does not exist, the CPU 14 may conduct the color conversion as part of the compression method. The digital image is transmitted one frame at a time to the RAM 16 over the BUS 20.

The CPU 14 compresses an image frame provided to the RAM 16. The frame by frame compression of the present invention permits the system to use frame differencing methods at the block level, whereby comparisons are made between consecutive frames, and blocks with data common to consecutive frames are represented with a short codeword indicating commonality that comprises fewer bits than the bit pattern with associated colors normally needed to represent the data. This technique allows good compression in the context of a series of visual images such as a sequence of frames in a movie, since there is potentially identical information between consecutive frames.

In the system illustrated in FIG. 1, the CPU 14 executes compression software to compress the image frame. The CPU 14 compresses the frame stored in the RAM 16, and transmits the compressed frame to the read/write storage device 12 and/or to the network interface device for ultimately transmitting the compressed image to a remote destination through a digital network 31. Subsequent frames are similarly processed until the entire sequence of frames is compressed and stored in the storage device 12 or transmitted over the digital network 31.

To regenerate the original image, the compressed frames, one at a time, are provided over the BUS 20 from the storage device 12 into the RAM 16. In the case of a remote computer, the frames arrive through the digital network 31 to the network interface device 21 and are either transmitted from the network interface device 21 to the storage device 12 or to the RAM 16 or both. The CPU 14 decodes the compressed data and transmits the regenerated image to the display buffer 32. As illustrated, the display buffer 32 is coupled to a digital to analog (D/A) converter 34, which in turn is coupled to a display 36. The CPU 14 is synchronized with the display buffer 32 such that the frames are played back at the proper speed on the display 36 without exceeding the capacity of the display buffer 32.

Display 36 has a typical display resolution, 640 pixels in the horizontal and 480 pixels in the vertical. Common physical dimensions of display 36 range from 13 to 16 inches in the diagonal. As will be described, the method and apparatus of the present invention will work with displays of any size or resolution.

Figure 2:
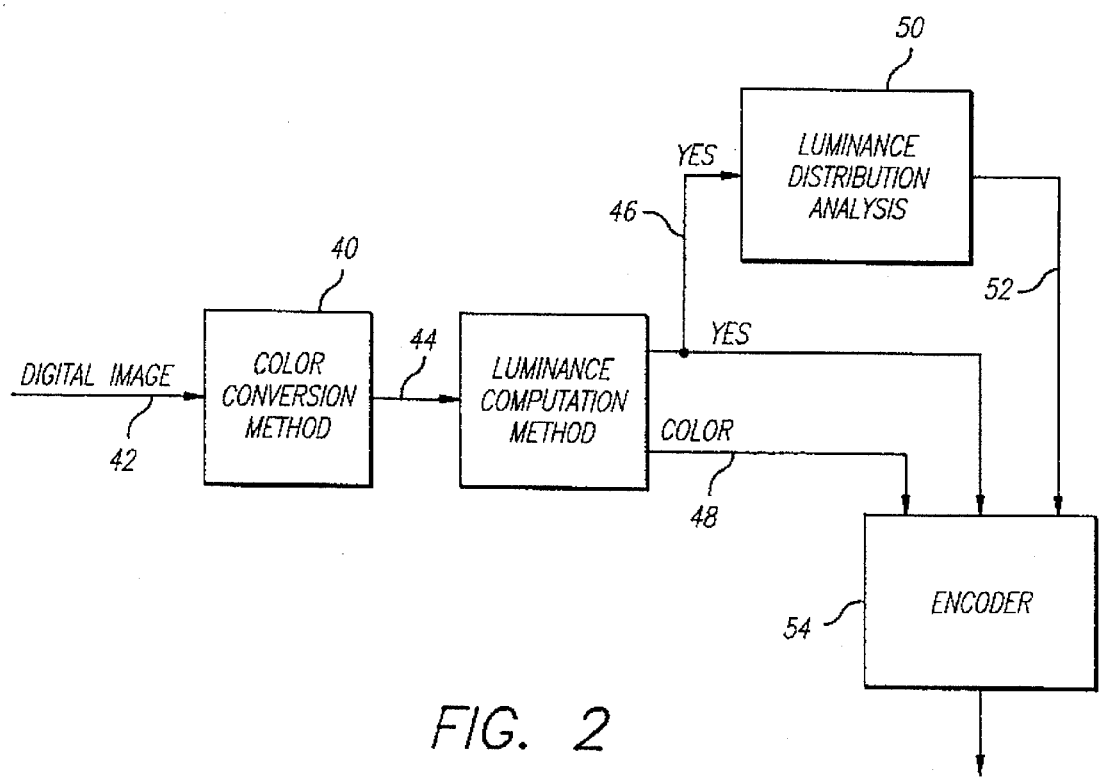
FIG. 2 is a functional block diagram of the compression and decompression system of the present invention.

Turning to the processing performed by CPU 14, FIG. 2 illustrates a block diagram of the compressor of the present invention. In the diagram of FIG. 1, the compressor illustrated in FIG. 2 is disposed within the CPU block 14. A digital signal 42 for a frame stored in the RAM 16 is provided to the color conversion method 40 which converts the digital image 42 into the desired color format in the absence of the color converter circuit 24. The correct color bit stream 44 is forwarded to a luminance computation method 44, which computes the luminance values of the pixels in the frame. The luminance distributions of the frame are analyzed by luminance distribution analyzer 50, which will be described more fully below, and the results of the analysis are provided to an encoder 54. The luminance analyzer 50 determines which pixels within a block will be grouped together and represented by the same color. To represent each group in a block with a single color, the encoder 54 processes the original luminance 46 and color 48 signals to determine the values of the colors that will represent each grouping.

As in color BTC encoding, pixels with different colors may be represented as the same color and "compression" results because pixels are encoded with fewer bits than if the encoding had to reflect all possible colors.

Figure 3:
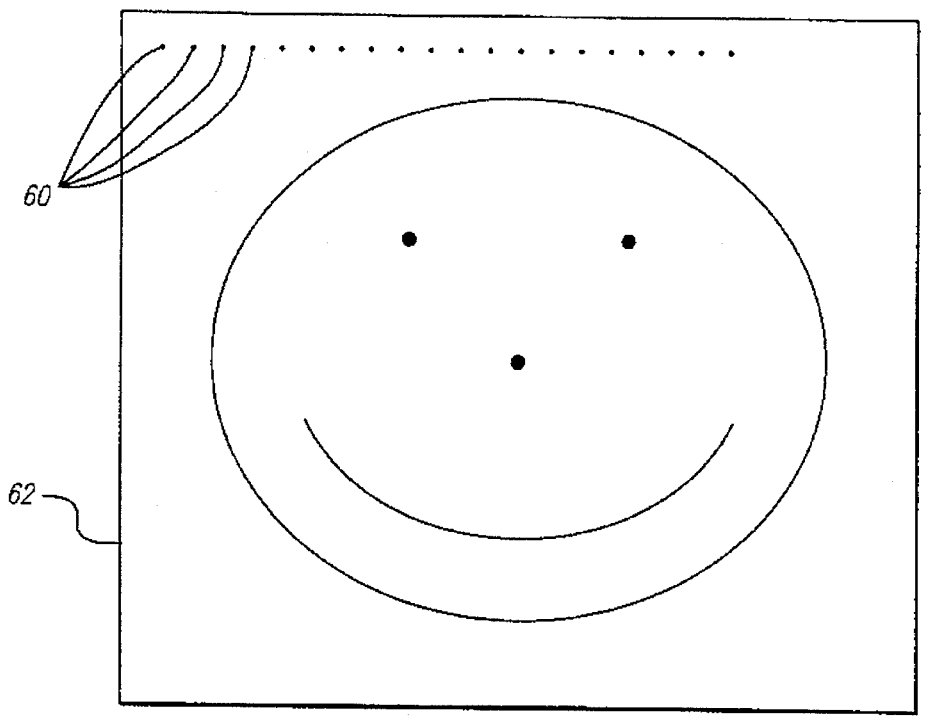
FIG. 3 illustrates an exemplary image frame to be compressed.

FIG. 3 illustrates a typical image 62, comprising one frame out of a continuous sequence, that is to be compressed. The image 62 is defined as an array of pixels 60, wherein each pixel has a corresponding color, represented in digital form in RAM memory 16, as previously described. For RGB 16 color format, each pixel may represent one of 65,536 different colors.

Figure 4:
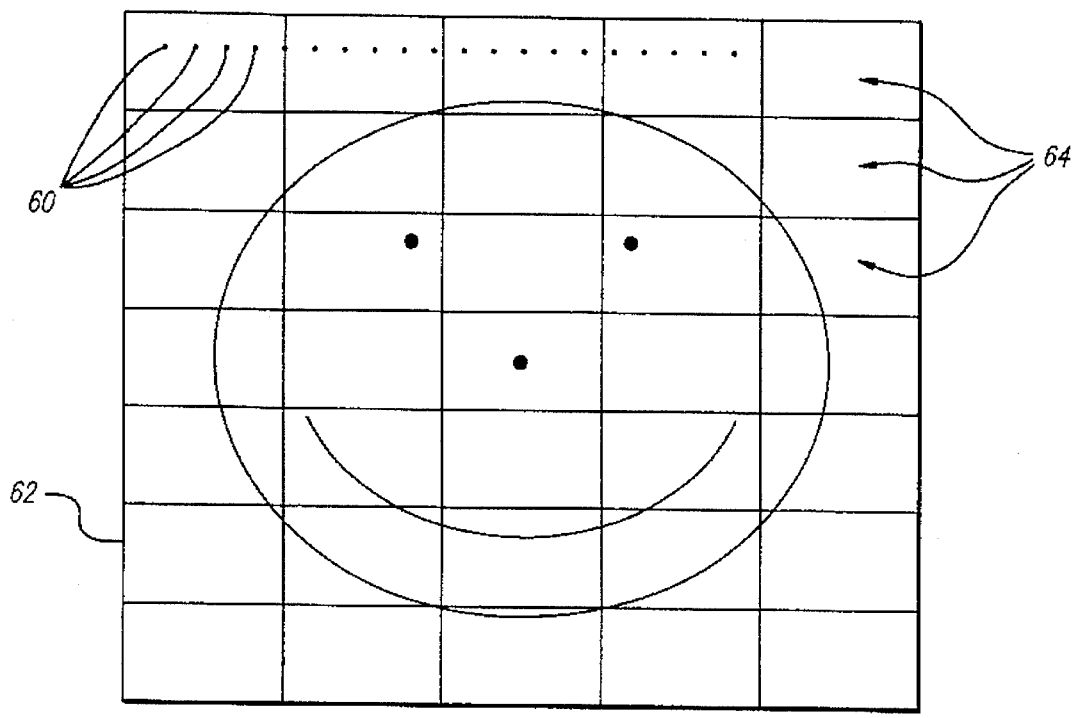
FIG. 4 illustrates the division of an exemplary image frame into blocks.

Referring now to FIG. 4, the method of the present invention divides the image 62 into non-overlapping contiguous blocks 64. In the preferred embodiment, each of the blocks 64 is defined by dimensions greater than would typically be employed in traditional BPIC methods. As previously discussed, dividing an image into larger blocks results in greater compression than if the image is divided into relatively smaller blocks. It will be apparent that a variety of block sizes may be chosen. Further, it will be appreciated that the image may be divided into geometrical patterns other than squares. However, to maintain ease of decompression, rectangular regions are preferable.

Each of the blocks 64 is tested to determine whether it may be represented by one color. A block will typically have a distribution of colors. If most of these colors are very close to one color, it may be possible to represent the entire block as one color. If the test is properly devised, the loss in information caused by representing pixels with slightly different colors as one color will not be perceived by the human eye. In this Specification, a block that may be represented as one color is referred to as being "homogeneous."

The first step in testing for homogeneity is to generate a luminance distribution of each block 64. When the block size is large (i.e., 16 pixels×16 pixels or 32 pixels×32 pixels) as permitted by this invention, it is preferable to collect the luminance information of the block in a histogram to eliminate scanning the block successively to compute and detect its homogeneous pixel distributions. Since information within a block tends to have little dispersion, by keeping the minimum and maximum values of the luminance range in a block and its histogram, it becomes more computationally efficient to access the information in the histogram than to re-scan the block to successively split non-homogeneous pixel distributions or to merge adjacent homogeneous pixel distributions, steps that will be described below.

Figure 5:
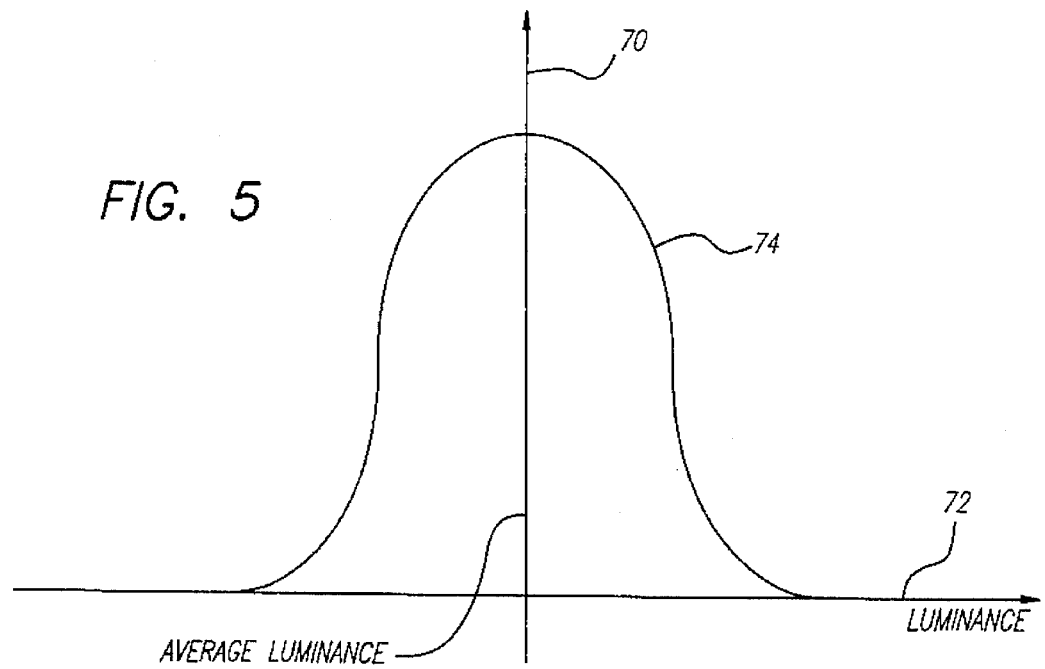
FIG. 5 illustrates a representative luminance distribution for a homogeneous block.

Referring now to FIG. 5, a luminance distribution 74 of a block 64 that is homogeneous under the test of the present method is illustrated. In the diagram, the horizontal (x) axis 72 represents luminance and the vertical (y) axis 70 represents the number of pixels with a particular luminance value. The luminance of pixels is employed to detect similarities in color since the luminance value of a pixel contains the proper proportion of red, blue and green to facilitate detection of color similarities. Colors that appear more like one another to the human eye have luminance values that are closer together than colors that appear more dissimilar to the human eye.

If a block 64 is comprised of pixels that are all sufficiently close to one color, and thus sufficiently close to one luminance value, the method of the present invention represents the entire block as that one color. The less deviation the curve has around the average luminance, the more accurately the image may be represented as one color.

Whether a curve has a sufficiently small deviation around the average luminance to be represented as one color is determined in the preferred embodiment by the following test, as disclosed in U.S. patent application Ser. No. 07/965,580 assigned to IBM by Arturo Rodriguez, Mark Pietras and Steven Hancock, filed October, 1992 and titled "HYBRID VIDEO COMPRESSION SYSTEM AND METHOD CAPABLE OF SOFTWARE-ONLY DECOMPRESSION IN SELECTED MULTILMEDIA SYSTEMS." S is defined as the variance (standard deviation) in luminance of the entire image, and T is defined as the variance in luminance of the pixel distribution being tested for homogeneity. If a pixel distribution is defined as homogeneous if Q percent or more of its pixels belong to the same class, then it is then said to be homogeneous if it satisfies the expression of T<S $(Q(1-Q))^{1/2}$. Q is chosen to be higher for distributions with relatively few pixels and lower for distributions with relatively many pixels since the tolerance for error increases as the distribution size increases. An examplary choice of Q for a distribution with 16 pixels is 0.93. An examplary choice of Q for a distribution with 1024 pixels is 0.85. The proper choice of Q for a distribution is within the capability of a person of ordinary skill in the art and will not be discussed further.

Since pixel distributions of perceptually homogeneous image regions are asymmetrical, both a left and right standard deviation of the pixel distribution in question are measured and they both must satisfy the test for the distribution to be deemed homogeneous.

An alternative homogeneous test is to employ an edge detection operator (i.e., a 2-D first order differential operator) spatially at each pixel in the block and to compute the magnitude of such operator at each pixel. If the magnitude of the edge detection operator is small (below a threshold) for each pixel in distribution in question, the pixel distribution is deemed homogeneous since there is no significant spatial change.

If the complete pixel distribution of the block satisfies the homogeneity test, it is represented by a single color. The single color of the block is derived by calculating the average color of the pixels in the homogeneous block. How to calculate the average color of a group of pixels is well known in the art and will not be discussed. The representation of the block as a bit stream will be discussed below.

A block may have a sufficiently broad mix of colors that it may not be represented as one color without an unacceptable loss in the fidelity of the decompressed image. Accordingly, a block with this type of distribution will fail the above homogeneity test. An exemplary distribution 75 of a block that fails the homogeneity test is shown in FIG. 6.

In accordance with the teachings of the present invention, the distribution 75 that fails the homogeneity test is split into two pixel distributions 80 and 82, as illustrated in FIG. 7. The distribution 75 is split in the following fashion: the average luminance of the distribution 75 of FIG. 6 is calculated, and those pixels with a greater luminance than average are placed into a high distribution 82, as shown in FIG. 7(b), while those pixels with an equal or lesser luminance than this average are placed into a low distribution 80, as shown in FIG. 7(a). Thus, the block with the distribution shown in FIG. 6 is split by luminance distribution, rather than by physical area (i.e. division of the block into smaller blocks), as in prior art recursive BPIC techniques.

The two separate distributions 80 and 82 as shown in FIGS. 7(a) and 7(b) are each tested for homogeneity with the selected homogeneity test. As previously described, in the preferred embodiment, a distribution in question is said to be homogeneous if both left and right luminance standard deviations are smaller than a threshold. The threshold is preferably a function of the standard deviation of the luminance of the complete image or frame.

If a distribution 80 or 82 as shown in FIGS. 7(a) and 7(b) fails the selected homogeneity test, it is again split into two distributions as shown in FIGS. 8a, 8b, 8c and 8d by calculating the average luminance value of the distribution 80 or 82 respectively to separate the distribution 80 or 82 into a distribution having a greater luminance value than the average and a distribution having an equal or lesser luminance value than the average.

Figure 8A:
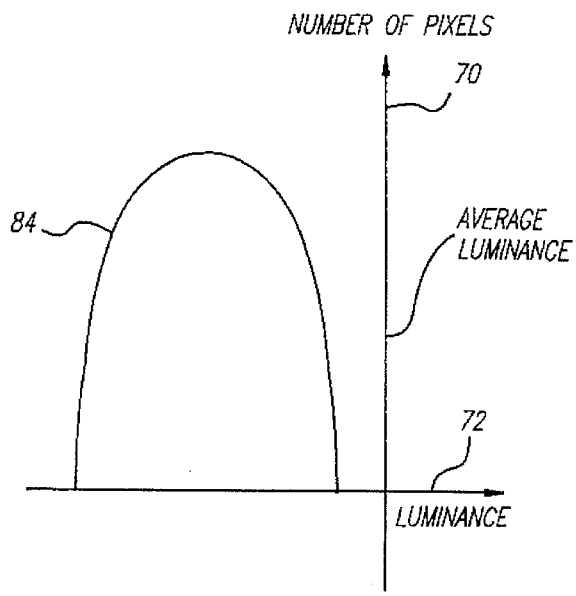
FIGS. 8a and 8b illustrate the division of the distribution of FIG. 7a into two, separate distributions.
Figure 8B:
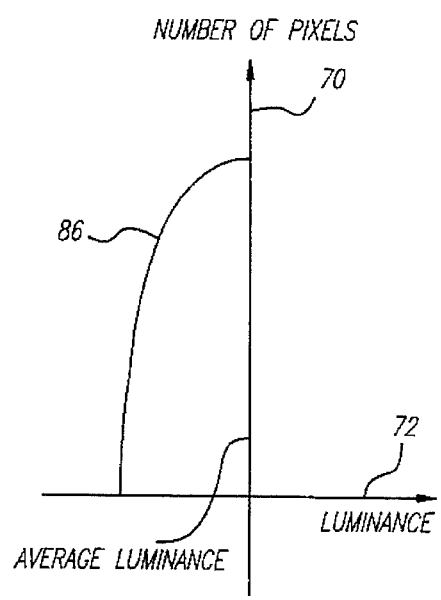
Figure 8C:
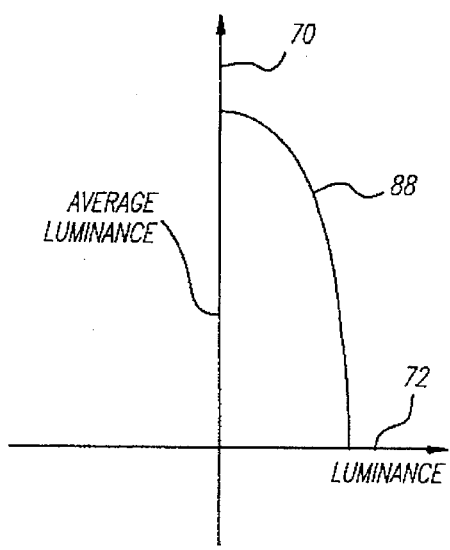
FIGS. 8c and 8d illustrate the division of the distribution of FIG. 7b into two separate distributions.
Figure 8D:
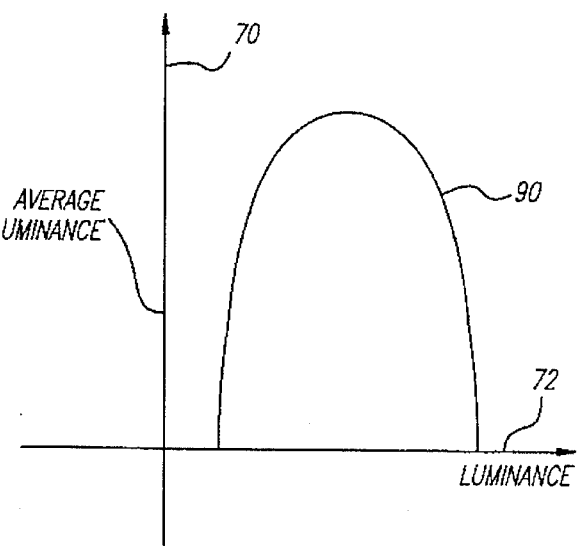

Distribution 80 as shown in FIG. 7(a) is split into distributions 84 and 86, as shown in FIGS. 8a and 8b while distribution 82 as shown in FIG. 7(b) is split into distributions 88 and 90 as shown in FIGS. 8c and 8d. The homogeneity test is applied to each distribution 84, 86, 88 and 90. In the preferred embodiment, each time the test is applied, a distribution in question is said to be homogeneous if both left and right luminance standard deviations are smaller than a threshold. The threshold is preferably a function of the standard deviation of the luminance of the complete image or frame.

The steps of testing for homogeneity and splitting non-homogeneous distributions are recursively applied until the block has been divided into a plurality of homogeneous distributions. Instead of assigning a different color to each homogenous distribution, a merging test is performed to merge homogenous distributions that were split by the splitting process but may actually be a homogeneous distribution when merged.

The distributions 86 and 88 as shown in FIGS. 8(b) and 8(c) are examples of distributions that are homogenous when merged. As previously discussed, distribution 86 was split from distribution 80, and distribution 88 was split from distribution 82. The splitting process of the present invention does not separately check for homogeneity in the merged distribution 92 shown in FIG. 9. The merged distribution 92 is the addition of the distributions 86 and 88. The distribution 92 is checked for homogeneity.

Figure 9:
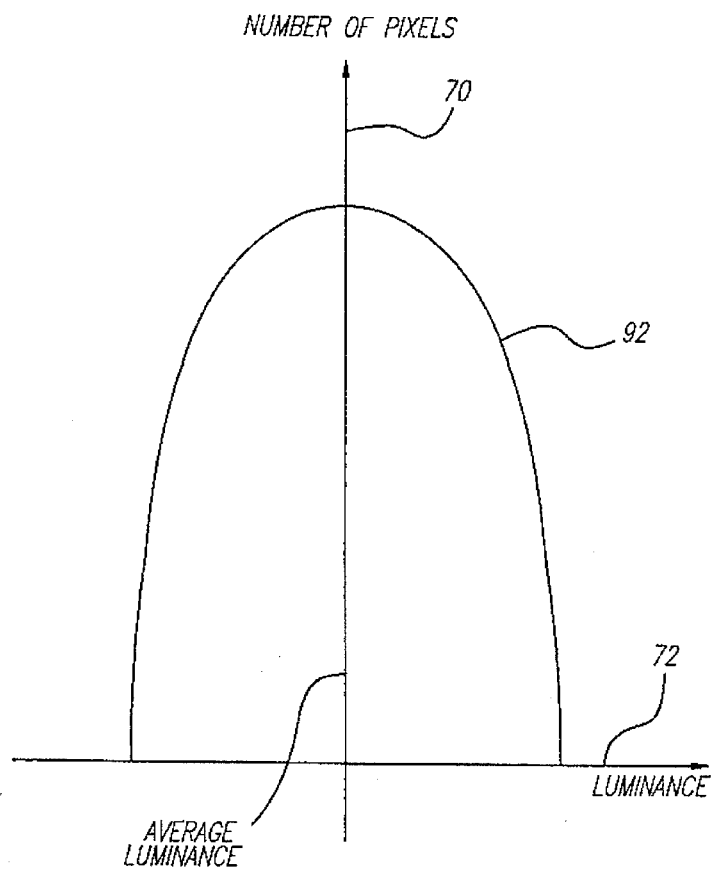
FIG. 9 illustrates distribution formed by the merger of the distributions of FIGS. 8b and 8c.

In most instances, the merging step of the present invention as described with reference to FIGS. 8 through 9, results in greater compression. By merging together different pixel distributions, and assigning a single color to the merged group instead of assigning two different colors to the different groups, one less color has to be represented in the encoding format.

Figure 10A:
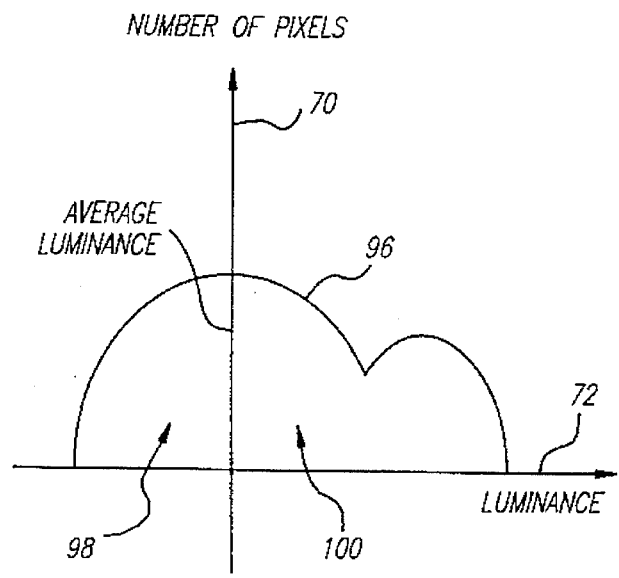
FIG. 10a illustrates another example of a luminance distribution of a non-homogenous block.
Figure 10B:
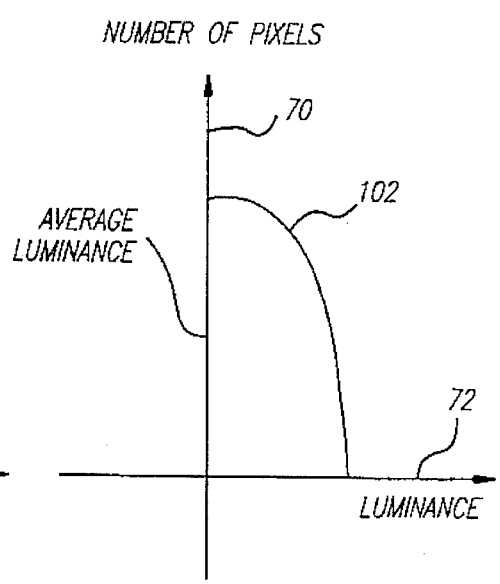
FIGS. 10b and 10c illustrate the division of part of the distribution of FIG. 10a into two distributions.
Figure 10C:
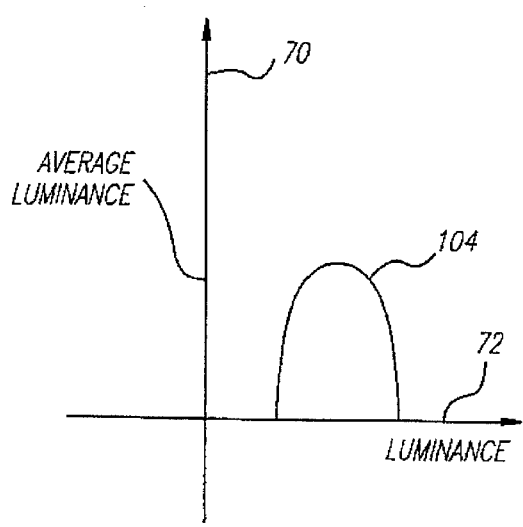
Figure 10D:
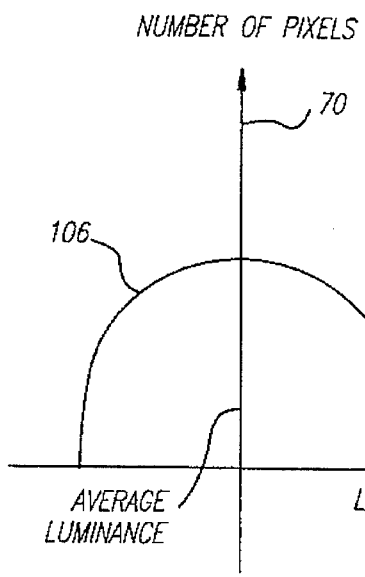
FIG. 10d illustrates a distribution formed by the merger of the distributions of part of FIG. 10a and FIG. 10b.

FIG. 10(a) also illustrates a distribution 96 where merging will be proper. The distribution 96 is divided into two distributions, one of which is homogeneous and the other of which is not. As shown in FIG. 10(a), the lower half 98 of the distribution 96 is homogenous while the upper half 100 of the distribution 96 is not homogenous, and is divided into two distributions, 102 and 104, as show in FIGS. 10b and 10c. The lower half 102 of the upper half 100 of distribution 96, as shown in FIG. 10(b), is merged with the original lower half 98 of the distribution 96 of FIG. 10(a) to form distribution 106 as shown in FIG. 10(d). Distribution 106 is tested for homogeneity. Likewise, if the upper part of the first distribution is homogeneous and the lower part of the first distribution is not, the higher part of the lower distribution is merged with the higher distribution and the merged distribution checked for homogeneity.

The block 64 is split into distributions, the split distributions are checked for homogeneity and then checked for possible merging until the entire block 64 has been resolved into a series of homogeneous distributions. The flow chart of FIGS. 12(a)–12(h) is one possible implementation of the recursive process of dividing distributions and merging distributions, as illustrated in FIG. 5 through FIG. 10, until the entire block 64 is processed and encoded.

Figure 12A:
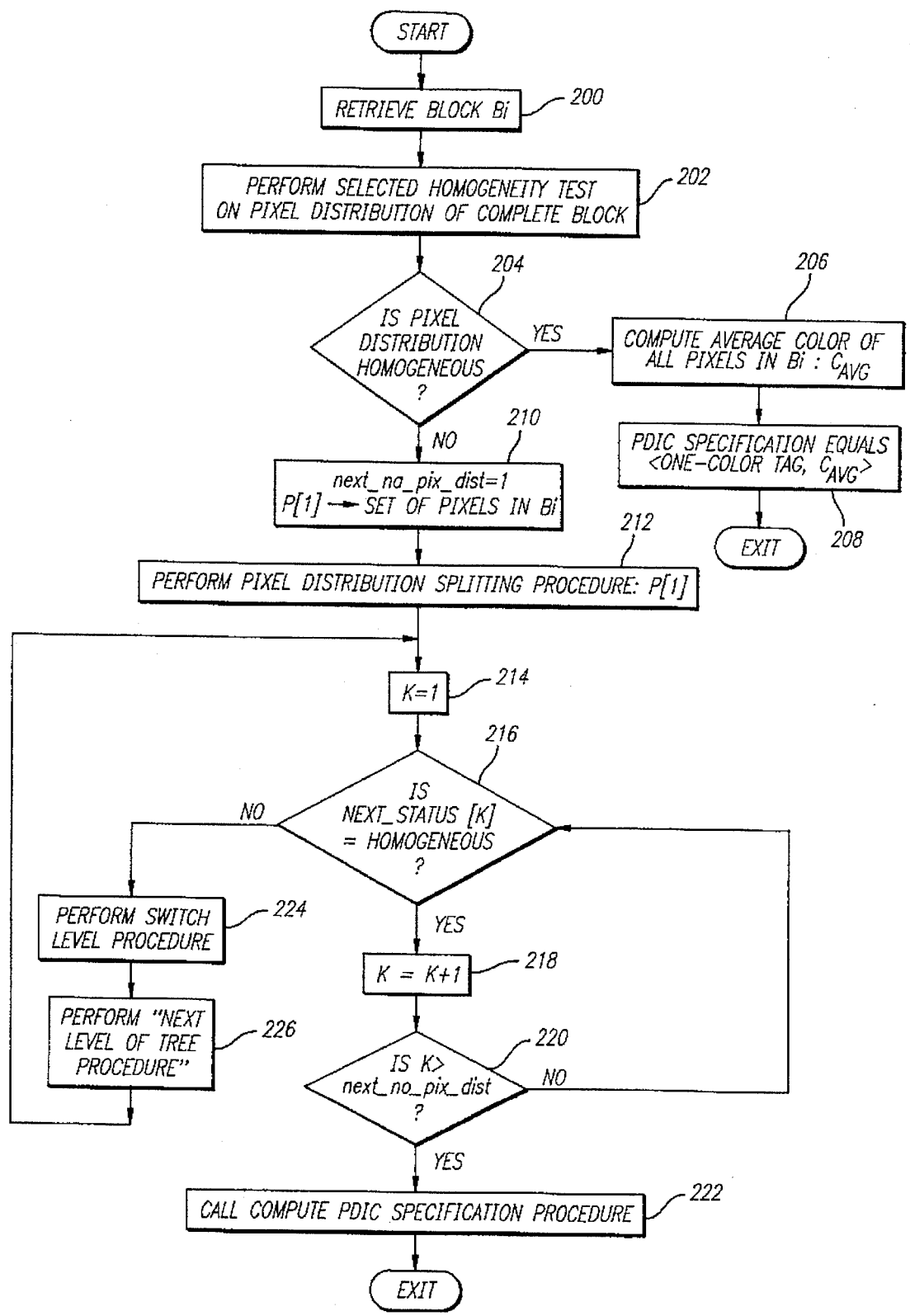

Turning to the flow chart shown in FIGS. 12(a)–12(h), as shown at step 200 of FIG. 12(a), a block $B_i$ is retrieved from a frame being compressed. The block $B_i$ is tested for homogeneity at step 202. If the block is homogeneous, the average color of the pixels in the block is computed as shown in step 206 and the block is encoded at step 208 as will be further described below.

If the block is not homogeneous, step 204 branches to step 210, which sets a variable next_no_pix_dist equal to one and also sets the first element of the current distribution pointer array P[] to point to all the pixels in block $B_i$. The process of recursively splitting distributions in half results in a binary tree structure and next_no_pix_dist represents the number of pixel distributions at the next level of the tree after the current level.

If the block $B_i$ is not homogeneous, it is split into two distributions as shown at step 212, which calls the "pixel distribution splitting procedure" as shown in FIG. 12(b). As shown at step 228 of FIG. 12(b), the procedure accepts as an input a pixel distribution, which is currently all of the pixels in $B_i$. At step 230, the average value of these pixels is computed. At step 232, the first pixel in the distribution that was split is retrieved and tested to determine whether it is greater than the average luminance, as shown at step 234. As shown at step 236, Pixels with lesser or equal luminance than the average are placed in a pixel distribution at the next level of the tree as represented by the array next_P[next_ no_pix_dist]. Conversely, as shown at step 242, pixels with a greater luminance than the average are placed in a pixel distribution at the next level of the tree as represented by the array next_P[next_no_pix_dist+1]. Thus, the children of the split distribution are ordered by luminance value, from lower luminance to higher luminance, as represented by next_no_pix_dist.

Each pixel in the distribution being split is placed in one of the two distributions as shown in steps 234–242 of FIG. 12(b). Once the parent distribution has been split, the children are tested for homogeneity as shown in steps 244 and 254. As shown in steps 246, 248, 256 and 260, homogeneous children are tagged as homogeneous: by an array called next_status which is indexed by next_no_pix_dist while non-homogeneous distributions are tagged as non-homogeneous, as shown in steps 250 and 258. The procedure then exits and control returns to the calling procedure, in this case the PDIC procedure as shown in FIG. 12(a) where step 214 is next executed.

Step 214 initializes a variable k to track the current distribution being analyzed. K is initialized to point to the first distribution at the next level. As shown at step 216, the next_status array is examined to determine if the distribution pointed to by K is homogeneous. If the distribution pointed to is homogeneous, step 216 branches to step 218, which increments k to point to the next distribution. As shown at step 220, if k exceeds the number of pixel distributions at the next level, then the method has processed all of the distributions and the "PDIC specification procedure" as shown in FIG. 12(g) is called.

Figure 12C:
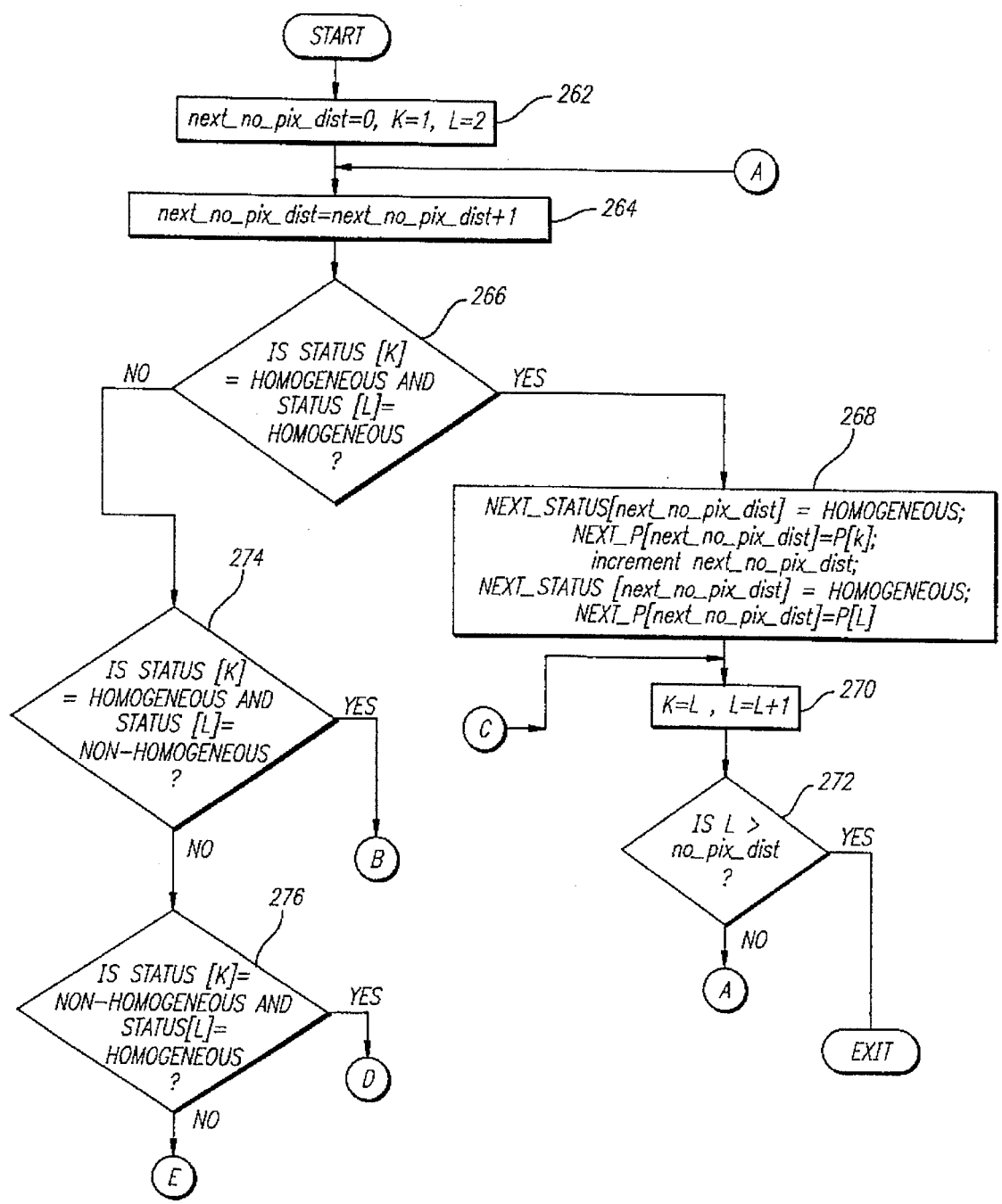
Figure 12D:
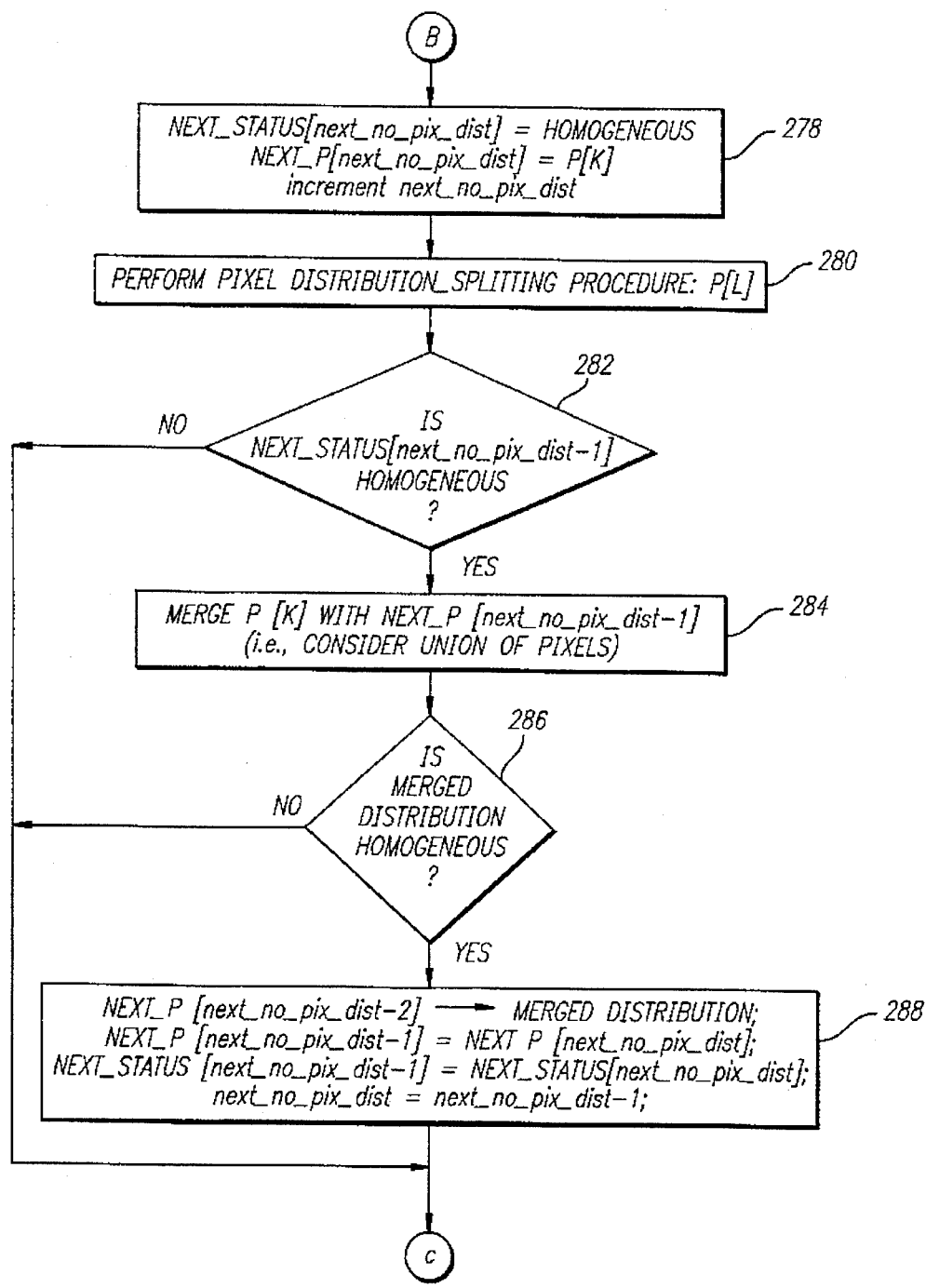
Figure 12E:
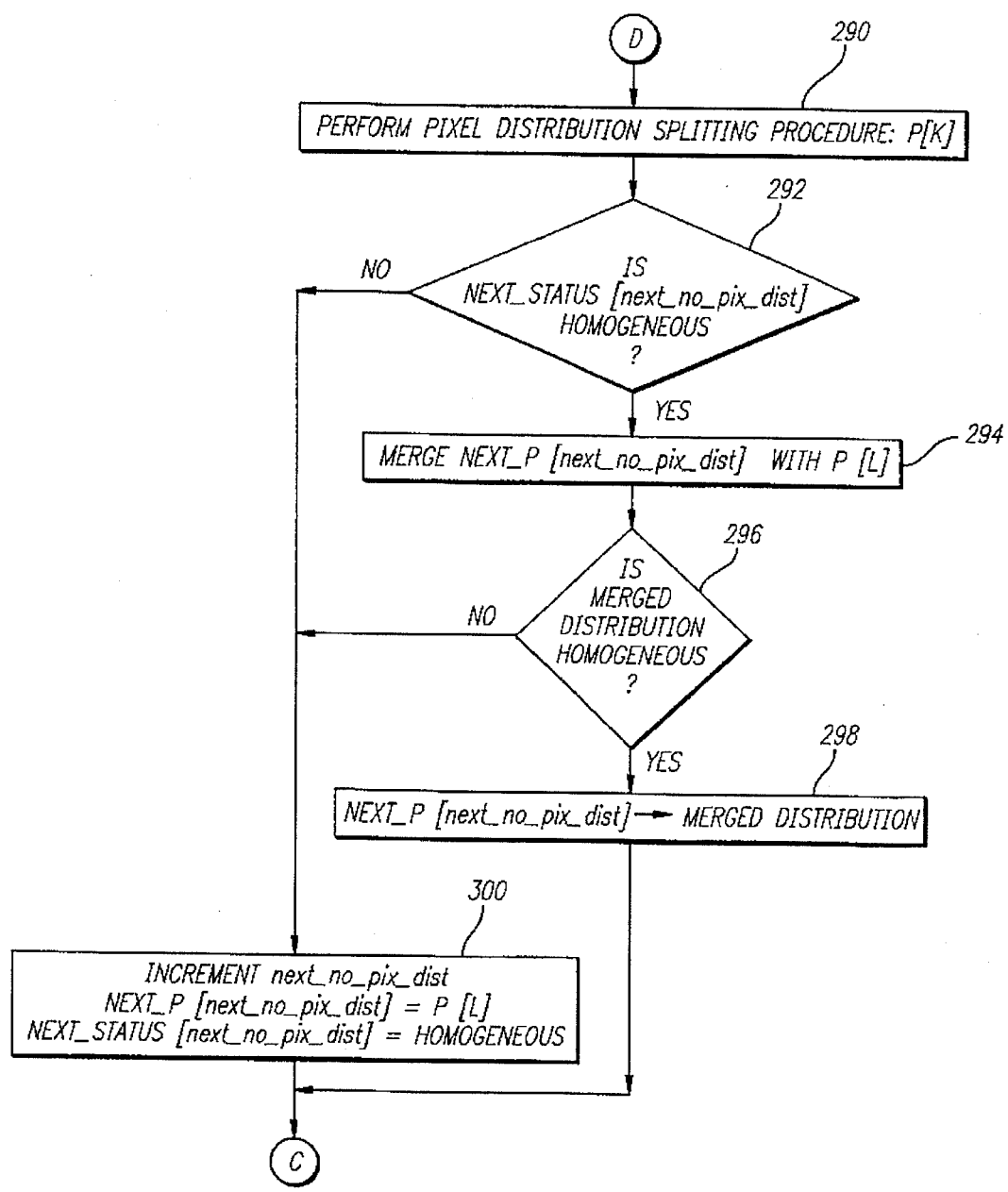
Figure 12F:
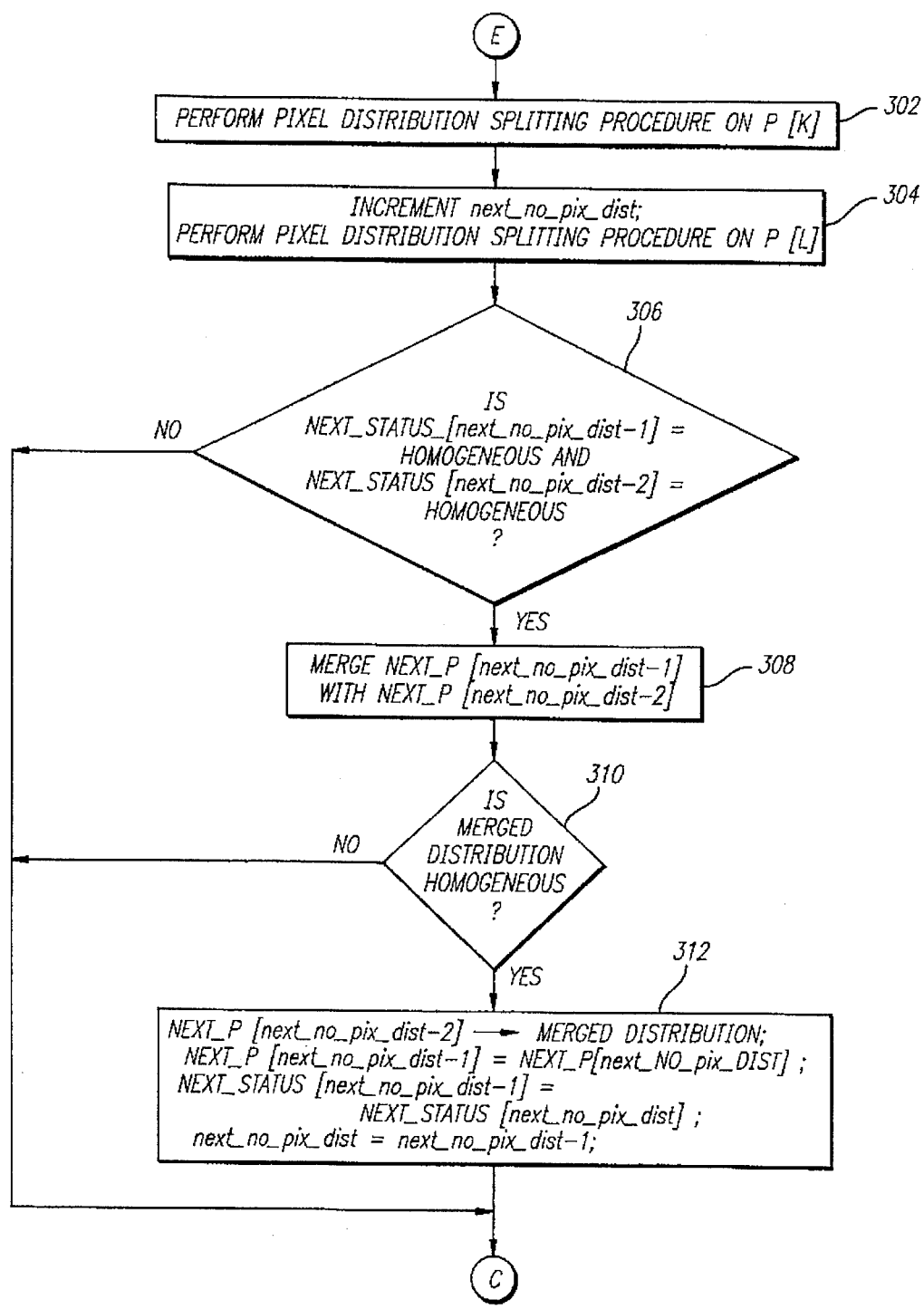
Figure 12G:
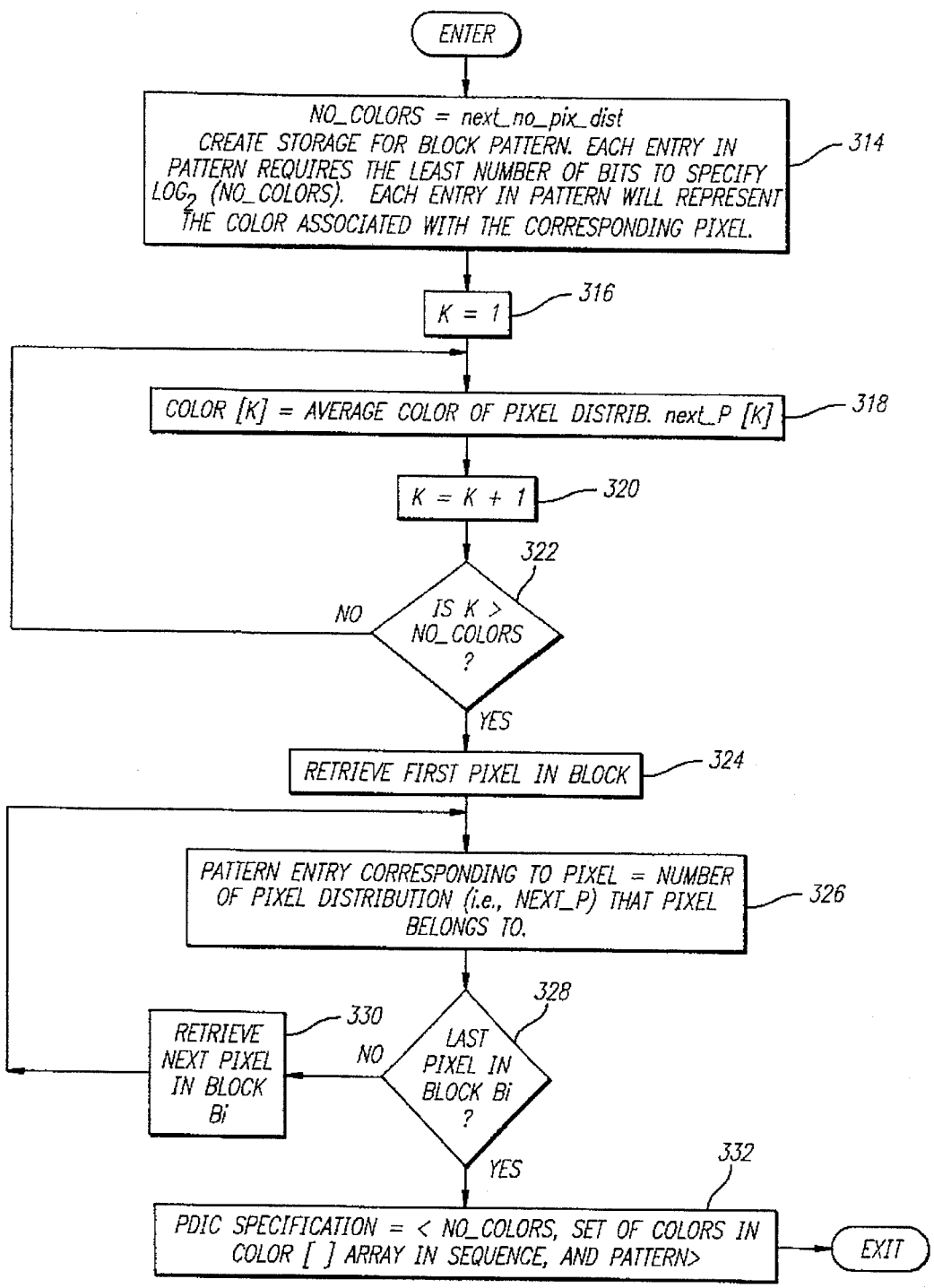

As shown in FIG. 12(g), the FDIC specification procedure encodes each homogeneous distribution with the number of colors represented by the number of homogeneous distributions, which is stored in next_no pix_dist. As will be described below, step 314 associates colors with n-nary bit patterns to represent those colors. At step 316, a variable k is set to one and, as shown at steps 318–322, the average color of the final homogeneous distributions is calculated. As shown at steps 324–330, the pixels in the block are encoded with the pattern corresponding to their average color. Step 332 encodes the block as will be described further below and the method exits since it has finished processing the current block.

Figure 12H:
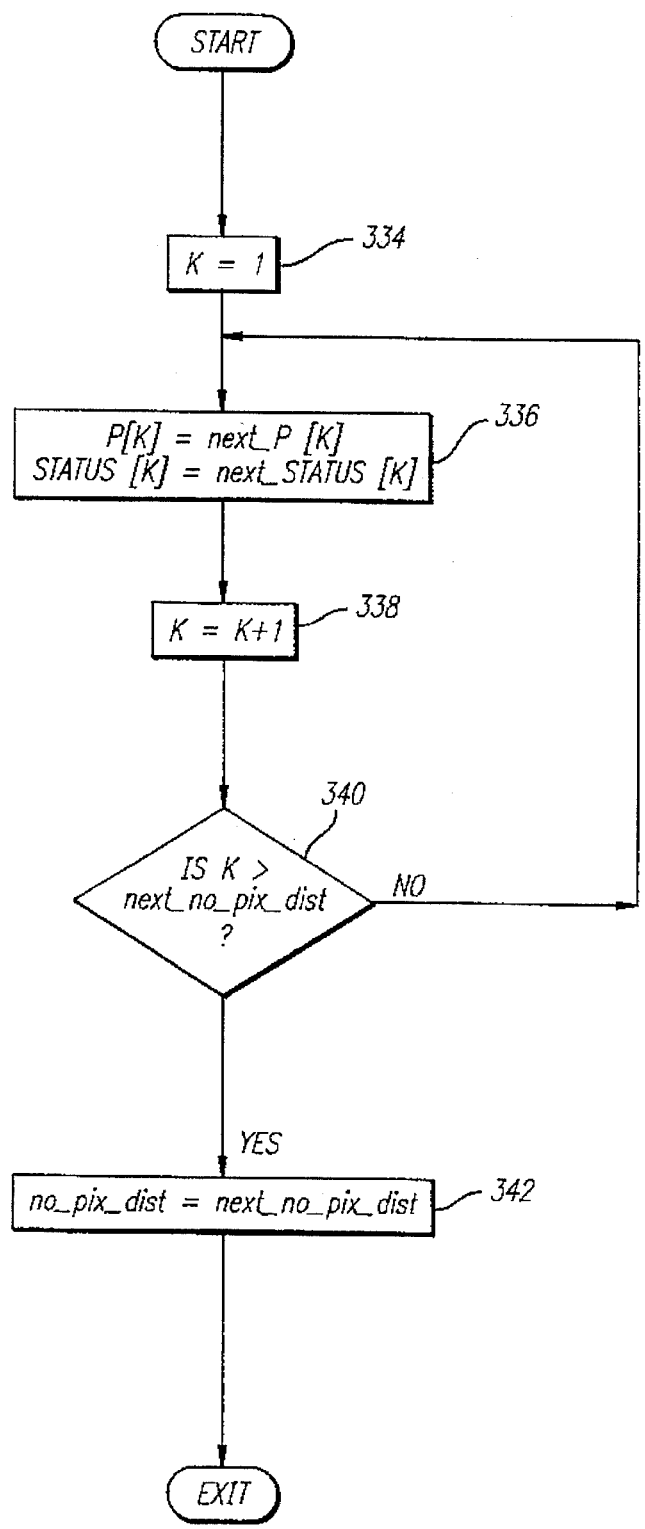

Returning to step 220 of FIG. 12(a), if there are more distributions at the next level, step 220 loops back to step 216 where the next distribution is checked for homogeneity. If the next distribution is not homogeneous, step 216 branches to step 224, which switches levels in the tree, as shown in FIG. 12(h). A non-homogeneous distribution implies that the tree has a next level which must be analyzed. To analyze the next level of the tree, the arrays that track the current level of the tree must be set equal to the arrays that track the next level of the tree.

As shown in FIG. 12(h) at step 334, a variable k is set to one. Variable k is used as an index into the next distribution array, next_p, and the array which tracks homogeneity of the next distributions, next_status. As shown at step 336, the current level arrays P[ ] and status[ ] are set equal to the corresponding next level arrays next_P and next_status for every distribution at the next level. If there are more distributions at the next level, step 340 branches back to step 336. If there are no more distributions at the next level, the number of pixel distributions at the current level is set equal to the number of pixel distributions at the next level as shown in step 242. Control is returned to step 226 of FIG. 12(a).

All distributions at the new current level must be checked for homogeneity and merging. As described above, a distribution may be merged with a distribution at the same level of the tree or a distribution one level higher in the tree. As shown in FIGS. 12(c)–12(f), the "next level of tree" procedure performs this function.

Turning to the next level of tree procedure as shown in FIG. 12(c), at step 262, variables k and l that track the children of the split parent are set to 1 and 2 respectively. Thus, k initially points to the first distribution in the current level and l initially points to the second distribution in the current level. The ordering imposed by steps 236 and 238 of FIG. 12(b) ensures that distributions are numbered according to luminance, with lower luminance valued distributions indexed with lower numbers than higher luminance valued distributions. As shown at step 264 of FIG. 12(c), next_ no_pix_dist is incremented by one to track the number of distributions at the next level from the current level. As shown at step 266, if both the distribution pointed to by k and the distribution immediately to its right (right representing the distributions with relatively higher luminance values) are homogeneous, the homogeneous distributions are propagated down a level in the tree as shown at step 268. As shown at step 270, k now will point to the distribution previously pointed to by l and l is incremented to point to the next distribution to the right. If l exceeds the number of pixel distributions, the procedure exits, as shown at step 272, since all distributions at the current level have been processed. If there are more distributions at the current level, step 272 branches back to step 264.

Returning to step 266 of FIG. 12(c), if one or both of the current pair of distributions being analyzed is not homogeneous, step 266 branches to step 274, which checks if the distribution pointed to by k is homogeneous and the distribution pointed to by l is not homogeneous. If so, step 274 branches to step 278 on FIG. 12(d). The homogeneous distribution P[k] is propagated down the tree as shown in step 278. At step 280, the non-homogeneous distribution P[1] is split. The left child of the non-homogeneous distribution P[1] is checked for homogeneity as shown at step 282 in FIG. 12(d). If the left child is homogeneous, it must be merged with P[k] as shown in step 284. This is analogous to merging P(low) with P(high, low) as shown in FIGS. 10(a)–10(d). If the merged distribution is homogeneous, it is propagated down the tree as shown at step 288 and next__no__pix__dist-1 points to the right child instead of pointing to the left child, which is now merged. If the merged distribution is not homogeneous, then the variable adjustment as shown in step 288 is not performed. Similarly, if the left child was not homogeneous as shown at step 282, the variable adjustment as shown in step 288 is not performed. After processing the left child for homogeneity and merging, the method passes back to step 270 as shown in FIG. 12(c) to continue processing towards the higher valued luminance distributions in the tree.

Returning to step 266, if the current distribution P[k] is non-homogeneous but the distribution to its right P[1] is homogeneous, step 274 branches to step 276 which branches to step 290 as shown in FIG. 12(e). The non-homogeneous distribution P[k] is split as shown at step 290 of FIG. 12(e). The right child of the non-homogeneous distribution is checked for homogeneity as shown at step 292 of FIG. 12(e). If the right child is homogeneous, it is merged with P[l], as shown at step 294. This is analogous to merging P(high) with P(low, high) as described above. If the merged distribution is homogeneous, it is simply propagated down the tree at the location of the right child, next__no__pix__dist, as shown at steps 296 and 298. Conversely, if either the merged distribution was not homogeneous or the right child was not homogeneous, P[l] is propagated down the tree as a homogeneous distribution, as shown at step 300. Control passes back to step 270 of FIG. 12(c), where processing is continued towards the higher valued luminance distributions in the tree.

Returning to step 266 of FIG. 12(c), the final possibility is that neither the current distribution P[k] nor its neighbor to the right P[1] is homogeneous. In this case, step 266 branches to 274 which branches to 276 which branches to step 302 of FIG. 12(f). As shown at steps 302 and 304 of FIG. 12(f), both the current distribution P[k] and its neighbor to the right P[l] are split. The right child of the lower distribution P[k] and the left child of the higher distribution P[l] must be checked for homogeneity as shown at step 306. If both are homogeneous, they are merged and the merger checked for homogeneity as shown at steps 308 and 310. This is analogous to merging P(low, high) with P(high, low) as illustrated in FIGS. 6–8. If the merged distribution is homogeneous, the pointer to the right child of the lower distribution P[k] is adjusted to point to the merged distribution and the pointer to the left child of the higher distribution P[l] is adjusted to point to the right child of the higher distribution P[l] so that three distributions, the left child of the low distribution P[k], the merged distribution and the right child of the high distribution P[l], are propagated down the tree. This adjustment is performed at step 312. If either the right child of the lower distribution P[k] or the left child of the higher distribution P[l] are not homogeneous, or the merger is not homogeneous, four distributions, the right and left children of both the low and high distributions P[k] and P[l] are propagated down the tree. Once again, control passes to step 270 of FIG. 12(c) and processing continues toward the right of the tree.

As previously described, the entire current level is checked for homogeneity and merging as performed by the next level of tree procedure as shown in FIGS. 12(c)–12(f). Once the level as been processed, it must be checked to determine if a new level of the tree must be added. As previously described, checking for a new level is performed by steps 214–220 of FIG. 12(a). Once a level contains only homogeneous distributions, the step 220 branches to step 314 as shown in FIG. 12(g) and the block is subsequently encoded. Thus, the flow chart as shown in FIGS. 12(a)–(b) illustrates a method for recursively resolving a block into homogeneous distributions while merging distributions when appropriate.

In addition to the decomposition of the block 64 into a series of homogeneous distributions, frame differencing techniques are employed to provide for optimal compression of the block 64. Frame-differencing methods for software-only video codecs exploit redundancy between frames without searching for potential motion displacement.

Frame-differencing by comparison methods are disclosed in a patent application entitled "Hybrid Video Compression Method Amenable to Software-only Decompression in Low-end Multimedia Systems," Ser. No. 07/965,580, filed October 1992. The inventors of this patent are Arturo A. Rodriguez, et al. The method and apparatus of the present invention provides an improvement to the method described in the Ser. No. 07/965,580 patent application.

In the method and apparatus of the present invention, frame-differencing is performed between successive blocks on a block to block basis. Pre-frame differencing on a block to block basis is performed by considering pixels at the corresponding spatial locations within the blocks or by considering the similarities between local image properties measured within the corresponding blocks. Alternatively, frames can be first compressed with the pixel distribution image coding (PDIC) method of the present invention and post-frame-differencing may then performed by considering the similarities between the data representation produced by the PDIC compression method in each pair of spatially corresponding blocks in every two consecutive frames.

The similarity test performed by the encoder is typically the absolute value of the difference between the luminance value of the spatially corresponding pixels in the blocks of the current frame, $F_i$, and the previous regenerated frame $D_{i-1}$. If the absolute difference is less than a specified threshold, the pixel is then deemed to not have changed from the previous reconstructed frame.

Local and global rules are used to allow a degree of lossiness when comparing spatially corresponding blocks. The local rules govern the maximum absolute difference between pixel values in the block that can be tolerated as a function of the values of the two pixels. The global rules monitor the overall accumulated difference that can be tolerated in the set of pixels. Alternatively, the global rule may be enhanced to reduce visible tiling artifacts by enforcing that all pixels along the block boundary satisfy the local rule.

Figure 13:
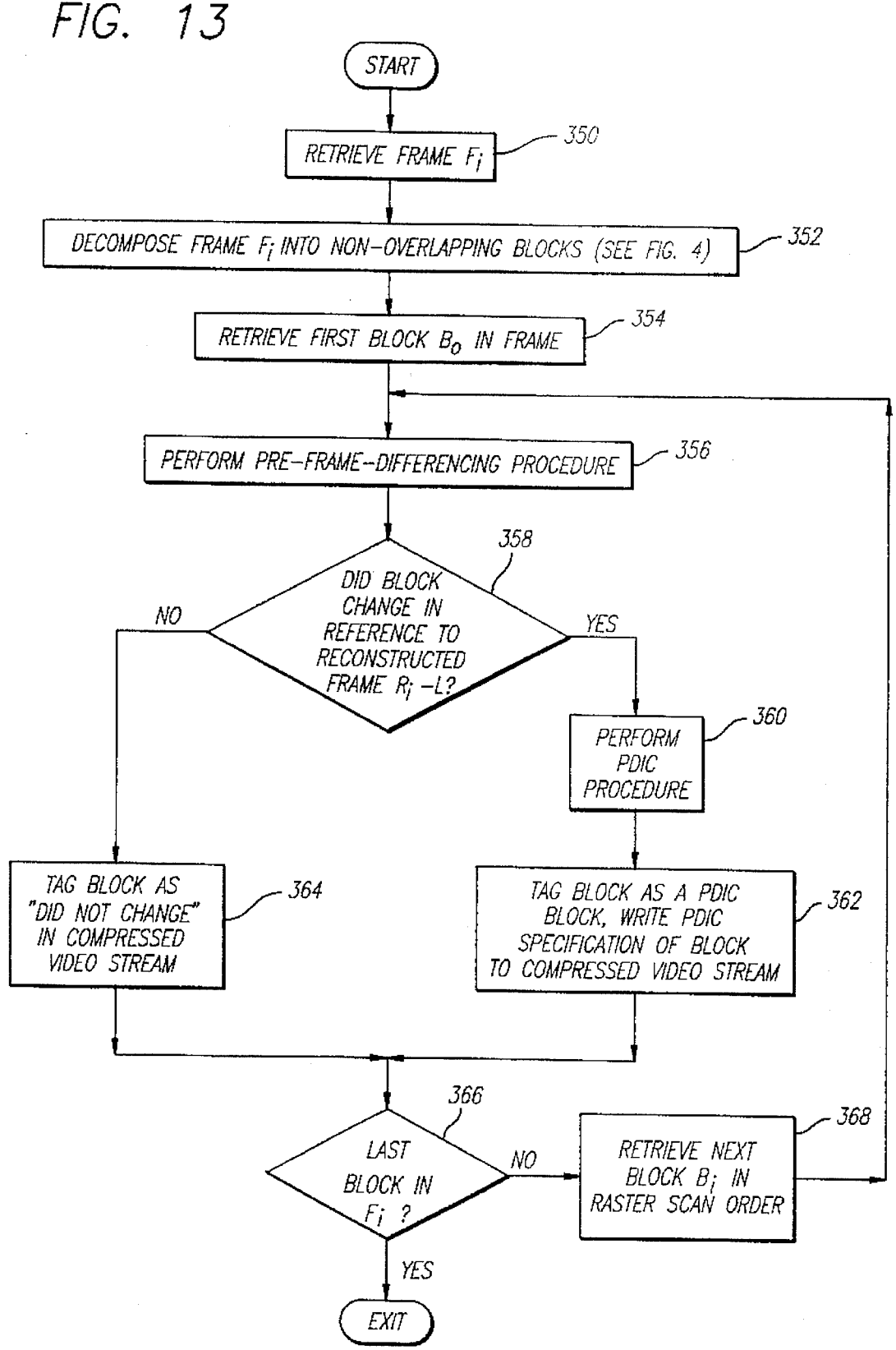
FIG. 13 is a flow chart representing the method of the present invention used in conjunction with pre-frame differencing.

FIG. 13 is a flow chart of the video compression method of the current invention using pre-frame differencing. In pre-frame differencing, pixels at corresponding spatial locations within corresponding blocks are compared for similarities. Alternatively, pre-frame differencing may be implemented by considering the similarities between local image properties measured within corresponding blocks. As shown at steps 350–352, a frame $F_i$ is retrieved and decomposed into non-overlapping blocks. The first block is retrieved at step 354 and pre-frame differencing is performed at step 356. As shown at step 358 in FIG. 13, a block is compared with an encoded block in the previous frame corresponding to the block in the current frame. If the block in the current frame did not change, the block is encoded to indicate that it did not change from the corresponding block in the previous frame as shown at step 364 of FIG. 13. If the block in the current frame did change, however, the PDIC method of the current invention is applied to decompose the block into homogeneous distributions and the distributions are encoded, as shown at blocks 360 and 362. Steps 366 and 368 ensure that the entire frame is processed.

Figure 14:
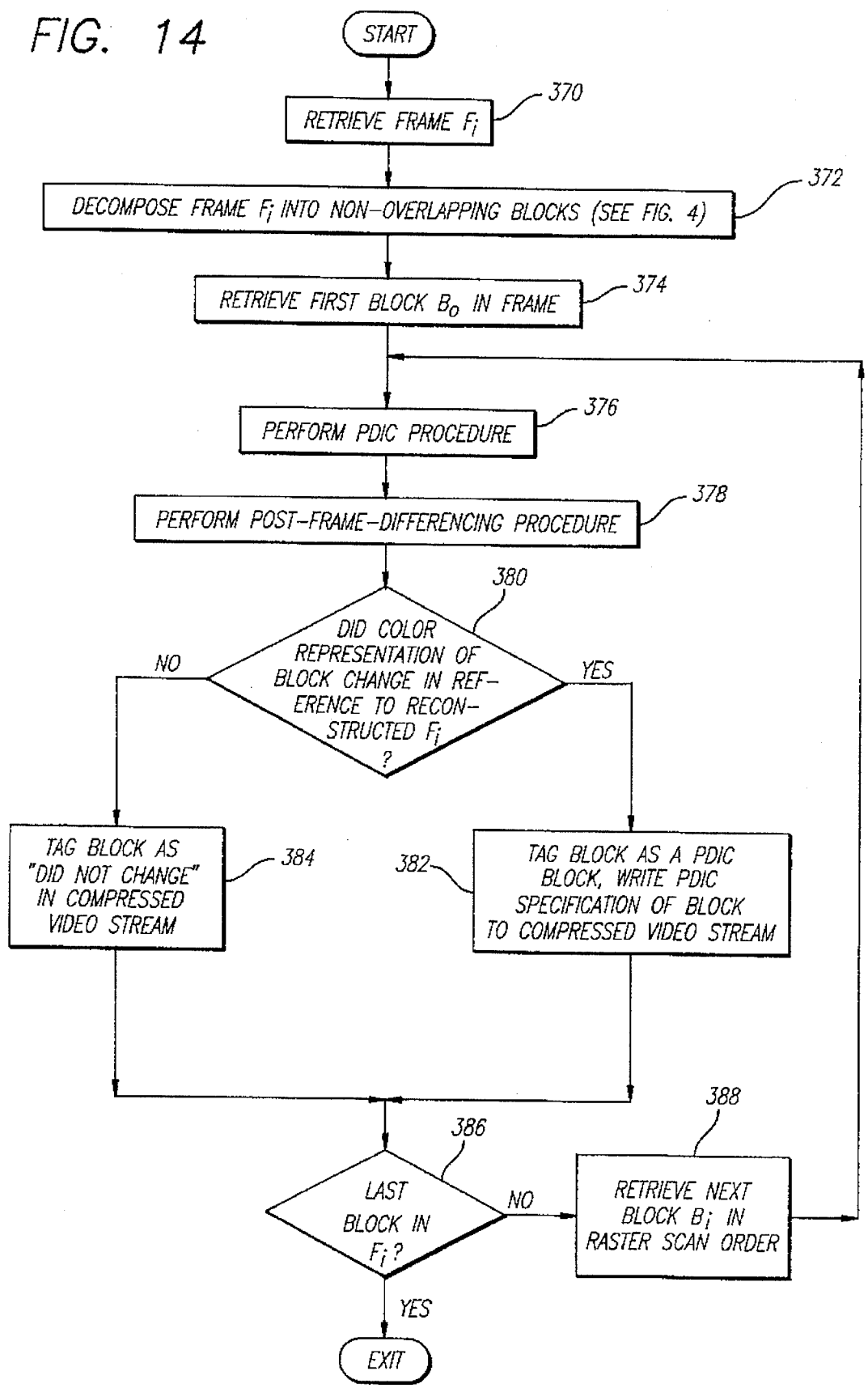
FIG. 14 is a flow chart representing the method of the present invention used in conjunction with post-frame differencing.

FIG. 14 is a flow chart of the video compression method of the current invention using post-frame differencing. As shown at steps 370 and 372 of FIG. 14, a frame $F_i$ is retrieved and decomposed into blocks. The PDIC procedure is performed on the first block in the frame as shown at steps 374 and 376. The PDIC processed block is then compared with the corresponding block in the previous frame as shown at step 380 of FIG. 14. If the block did not change, it is encoded to indicate that it did not change from the corresponding block in the previous frame as shown at step 384 of FIG. 14. If the block did change, however, it is encoded as a series of homogeneous distributions as generated by the PDIC method of the present invention, as shown at step 382. Steps 386 and 388 ensure that all the blocks in the frame are processed.

Figure 11:
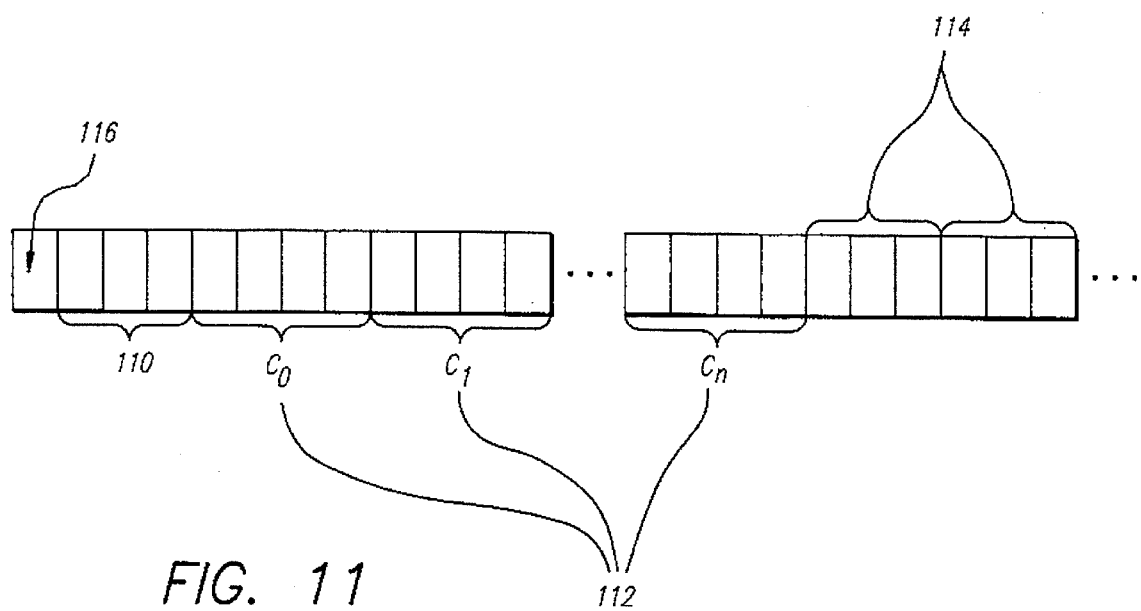
FIG. 11 illustrates the compression format of a block used by the preferred embodiment of the present invention.

Whether pre frame differencing or post frame differencing is used, if a block has changed from a corresponding block in the previous frame, the block is resolved into a series of homogeneous distributions and then encoded. FIG. 11 shows how the block is encoded. A fixed number of bits, color distribution field 110, fixes the maximum number of colors. For example, 3 bits in this field indicates a maximum of 8 colors. Color distribution field 110 contains the number of homogenous distributions in a block, after the final merging step is performed, up to the maximum permissible value. The next field, color field 112, contains the colors of the different distributions.

If a block is encoded as one color, the color field 112 contains the color representing the block. The individual pixels of the block are not encoded since each pixel is represented by one color. As discussed below, when the decompressor receives a value of 1 in the color distribution field 110, the decompressor inserts the color in color field 112 into each pixel in the block of the reconstructed image.

When a block contains two or more colors, individual pixels of the block are encoded in pixel field 114 with a bit pattern that corresponds to the colors represented in the color field 112. Pixels that are represented by the first color are coded with a bit pattern corresponding to the value "0". Pixels that are represented by the second color are coded with a bit pattern corresponding to the value "1".

If there are only two colors in the block, the bit pattern following the specification of the colors is a binary pattern to associate the two colors with each pixel in the block. If there are 3 or 4 colors with the block, because there or four homogeneous distributions ere found in the block, then the pattern will consist of 2 bit entries for each pixel in the block to associate the pixels with their corresponding colors. Generalizing, if there are n+1 homogeneous pixel distributions in a block, then pixels with a color $C_x$, $0 \leq x \leq N$, are encoded as the number x in each entry of the pattern in $\log_2$ (n+1) bits.

An alternative coding scheme may provide greater compression. If three colors exist in the block and a large proportion of pixels have the color 0, the following pattern may be used:

Color 0 pixels=0
Color 1 pixels=10
Color 2 pixels=11.

The most prevalent color may be chosen as color 0 to maximize compression.

This type of coding may be employed for any number of colors in a block. In one embodiment of the present invention, the compressor computes the number of pixels with the various colors and chooses the coding scheme that results in greater compression. This step comes at the cost of reducing the compression speed, since the apparatus performing the PDIC method must make these additional calculations.

As previously described, to take advantage of the redundancy in visual images, difference encoding may be employed in conjunction with the FDIC method of the present invention. In the encoding step, a predetermined code may indicate that the pixel color has not changed from its previous value. For example, for block with three colors, $C_o$ may be encoded as 00, C as 01, $C_2$ as 10 and those pixels that have not changed value from the previous frame encoded as 11. As shown in FIG. 11, one bit 116 may be dedicated for the entire block to indicate that the entire block has not changed from the previous block. It will be appreciated that other prior art data compression techniques may be applied to the bit stream that represents the compressed block. After each pixel in the block has been encoded, the compressor repeats the process on the next block of the frame, until the last block of the frame has been compressed. The compressed frame is stored and the next frame brought into the RAM 16, as shown in FIG. 1.

The decompressor is essentially the inverse of the compressor. The decompressor is programmed to parse off a fixed number of bits, color distribution field 110 as shown in FIG. 11, that represent the number of colors in the block. The decompressor assigns the colors $C_o$ through $C_n$ with the same bit patterns as the compressor. Thus, if the compressor assigned pixels that are color $C_o$ the bit pattern 0, the pixels with the bit pattern 0 are substituted with the value of $C_o$, which is a full color value, 16 bits for RGB 16 display modes. For example, suppose $C_o$ is she color white with a bit pattern of 0000. Pixels with the bit pattern 0 are substituted with the bit pattern 0000.

The color distribution field 110 allows the compressor to parse off the correct number of colors, $C_o$ through $C_n$, and also to parse off the correct number of bits per pixel, generally, calculated as $\log_2$ (n+1) bits.

The decompressed bit stream may then be viewed on the display 36, as illustrated in FIG. 1.

SUMMARY

The present invention as described provides methods and apparatus for storing a series of visual images in compressed form. While the present invention has been described with reference to the various figures, it will be appreciated that the figures are for illustration only, and do not limit the spirit and scope of the invention. For example, although the figures have, by necessity, used example distributions of visual frames, an infinite number of distribution shapes are possible. The method and apparatus of the present invention will operate with any such distribution. Further, it will be appreciated that there are many different encoding possibilities for encoding the homogeneous distributions and that the screen may split into a variety of geometric patterns other than blocks. Instead of using luminance to separate the distributions, chrominance or other values that are functions of color may be used. The method of the present invention may process analog images and be implemented by an analog computing device.

I claim:

1. A method for converting an image frame into an encoded data stream, including the steps of:

storing said image frame in a memory;

associating a group of pixels with a region of said image frame;

generating a first color distribution of said group of pixels associated with said region;

testing said first color distribution to determine whether said group of pixels associated with said region has a homogeneous color distribution;

if said group of pixels associated with said region does not have a homogeneous color distribution, dividing said first color distribution into two or more second color distributions;

testing at least one of said second color distributions to determine whether a group of pixels associated with said tested second color distribution has a homogeneous color distribution;

encoding a group of pixels associated with a homogeneous color distribution.

2. The method of claim 1 wherein said first color distribution comprises a luminance distribution of said group of pixels associated with said region.

3. The method of claim 1, wherein said group of pixels associated with said region has a homogeneous color distribution, further including the step of associating said region with a region color and encoding said group of pixels associated with said region as said region color.

4. The method of claim 3, wherein at least one of said groups of pixels associated with said tested second color distributions does not have a homogeneous color distribution, further including the steps of:

dividing a tested second color distribution associated with a group of pixels that does not have a homogeneous color distribution into two or more third color distributions;

testing at least one of said third color distributions to determine whether a group of pixels associated with said tested third color distribution has a homogeneous color distribution;

if said group of pixels associated with said tested third color distribution has a homogeneous color distribution, associating said tested third color distribution with a third distribution color and encoding said group of pixels associated with said tested third color distribution as said third distribution color.

5. The method of claim 4 wherein each of said second color distributions is tested to determine whether a group of pixels associated with said tested second color distributions is homogeneous.

6. The method of claim 5 further including the steps of:

testing each of said third color distributions to determine whether a group of pixels associated with said tested third color distributions is homogeneous;

if at least one of said groups of pixels associated with said tested third color distributions does not have a homogeneous color distribution, then dividing each of said tested third color distributions into two or more fourth color distributions;

testing each said fourth color distribution to determine whether a group of pixels associated with said tested fourth color distribution has a homogeneous color distribution;

if at least one of said groups of pixels associated with said tested fourth color distributions does not have a homogeneous color distribution, recursively dividing said tested fourth color distributions and testing each resulting color distribution until each tested final color distribution is associated with a group of pixels that has a homogeneous color distribution;

associating each final color distribution with a final distribution color and encoding a group of pixels associated with said final color distribution as one color.

7. The method of claim 3 wherein said step of dividing said first color distribution includes the steps of:

calculating an average luminance of said first color distribution;

associating a group of pixels that have a greater luminance than said average luminance with a high second color distribution;

associating a group of pixels that have a smaller luminance than said average luminance with a low second color distribution.

8. A method for converting an image frame into an encoded data stream, including the steps of:

storing said image frame in a memory;

associating a group of pixels with a region of said image frame;

generating a first color distribution of said group of pixels associated with said region;

testing said first color distribution to determine whether said group of pixels associated with said region has a homogeneous color distribution;

if said group of pixels associated with said region has a homogeneous color distribution, associating said region with a region color and encoding said group of pixels associated with said region as said region color;

if said group of pixels associated with said region does not have a homogeneous color distribution, dividing said first color distribution into two or more second color distributions;

testing at least one of said second color distributions to determine whether a group of pixels associated with said tested second color distribution has a homogeneous color distribution;

dividing a tested second color distribution associated with a group of pixels that does not have a homogeneous distribution into two or more third color distributions;

testing at least one of said third color distributions to determine whether a group of pixels associated with said tested third color distribution has a homogeneous color distribution;

if at least one of said groups of pixels associated with said tested third color distributions has a homogeneous color distribution, then if at least one of said groups of pixels associated with said tested second color distributions has a homogeneous color distribution, then merging said tested third color distribution associated with a group of pixels with a homogeneous color distribution with said tested second color distribution to form a first merged color distribution;

testing said first merged color distribution to determine whether a group of pixels associated with said first merged color distribution has a homogeneous color distribution;

if said group of pixels associated with said first merged color distribution has a homogeneous color distribution, associating said first merged color distribution with a first merged color distribution color and encoding a group of pixels associated with said first merged color distribution as said first merged distribution color;

if none of said groups of pixels associated with said tested second color distributions has a homogeneous color distribution, then testing a different third color distribution to determine whether a group of pixels associated with said tested different third color distribution of a homogeneous color distribution;

if a group of pixels associated with said different third color distribution has a homogeneous color distribution, then merging said tested third color distribution with said tested different third color distribution to form a second merged color distribution;

testing said second merged color distribution to determine whether a group of pixels associated with said second merged color distribution has a homogeneous color distribution;

if said group of pixels associated with said second merged color distribution has a homogeneous color distribution, associating said second merged color distribution with a second merged distribution color and encoding said group of pixels associated with said second merged color distribution as said second merged distribution color;

encoding a group of pixels associated with a homogeneous color distribution.

9. The method of claims 1 or 3 wherein said step of testing a color distribution for homogeneity includes the steps of:

determining a standard deviation, T, of said color distribution to be tested;

determining a standard deviation, S, of a color distribution from which said tested color distribution to be tested was derived; and defining Q as a percentage such that said color distribution to be tested is said to be homogeneous if $T < S (Q(1-Q))^{1/2}$.

10. The method of claim 3 wherein said step of associating said first color distribution with a first distribution color includes the steps of generating an average color of said first color distributions and associating said average color with said first color distribution.

11. The method of claim 1 wherein said step of encoding said group of pixels associated with said region includes the steps of:

assigning a number field to indicate that said group of pixels associated with said region has a homogeneous color distribution;

assigning a color field to represent said region color.

12. The method of claim 3 wherein said step of encoding said group of pixels associated with said second color distribution includes the steps of:

assigning a number field to indicate the number of distribution colors to be encoded;

assigning a color field to represent a distribution color to be encoded and associating a bit pattern with said distribution color to be encoded;

encoding a pixel in said region with one of said bit patterns associated with a distribution color such that said pixel associated with a color distribution is encoded with a bit pattern corresponding to the color associated with said color distribution associated with said pixel.

13. The method of claims 1 or 3 wherein at least one of said regions is a square.

14. The method of claims 11 or 12 further including the step of decoding said encoded data stream, said step including the steps of:

examining said number field;

if said number field indicates a homogeneous region, substituting each pixel in said homogeneous region with a bit pattern in said color field;

if said number field does not indicate a homogeneous region, associating each color in said color field with a bit pattern;

parsing said encoded pixels into separate portions;

substituting for each said separate portion a color associated with said portion.

15. An apparatus for converting an image frame into an encoded data stream, including:

storing means for storing said image frame in a memory;

first associating means for associating a group of pixels with a region of said image frame;

first generating means for generating a first color distribution of said group of pixels associated with said region;

first testing means for testing said first color distribution to determine whether said group of pixels associated with said region has a homogeneous color distribution;

first dividing means for dividing said first color distribution into two or more second color distributions, said first dividing means operative when said group of pixels associated with said region does not have a homogeneous color distribution;

first testing means for testing at least one of said second color distributions to determine whether a group of pixels associated with said tested second color distribution has a homogeneous color distribution;

encoding means for encoding a group of pixels associated with a homogeneous color distribution.

16. The apparatus of claim 15 wherein said first color distribution includes a luminance distribution of said group of pixels associated with said region.

17. The apparatus of claim 15 further including first distribution associating means for associating said region with a region color and second encoding means for encoding said group of pixels associated with said region as said region color, said first distribution associating means and said second encoding means operative when said group of pixels associated with said region has a homogeneous color distribution.

18. The apparatus of claim 15 further including second associating means for associating said second color distribution with a second distribution color.

19. The apparatus of claim 17 wherein said dividing means further includes:

calculating means for calculating an average luminance for a color distribution to be divided;

third associating means for associating a group of pixels that have a greater luminance than said average luminance with a high second color distribution;

fourth associating means for associating a group of pixels that have a smaller luminance than said average luminance with a low second color distribution.

20. The apparatus of claim 17 further including merging means for merging homogeneous distributions.

21. The apparatus of claim 15 or 17 wherein said first and second testing means further include:

first determining means for determining a standard deviation, T, of a color distribution to be tested;

second determining means for determining a standard deviation, S, of a color distribution from which said tested color distribution to be tested was derived; and defining means for defining Q as a percentage such that said color distribution is said to be homogeneous if $T<S(Q(1-Q))^{1/2}$.

22. The apparatus of claim 17 wherein said second associating means further includes average color generating means for generating an average color of a color distribution.

23. The apparatus of claim 17 wherein said second encoding means further includes:

first assigning means for assigning a number field to represent a number of homogeneous color distributions within said region;

second assigning means for assigning a color field to represent a final color or a plurality of final colors to be encoded.

24. The apparatus of claim 22 wherein second encoding means further includes:

bit pattern associating means for associating each of said plurality of final colors with a bit pattern;

pixel encoding means for encoding a pixel in said region with one of said bit patterns associated with a color such that said pixel associated with a color distribution is encoded with a bit pattern corresponding to the color associated with said color distribution associated with said pixel.

25. The apparatus of claim 17 wherein at least one of said regions is a square.

26. The apparatus of claim 23 further including a decompressor, said decompressor including:

examining means for examining said number field;

substituting means for substituting each pixel in said homogeneous region with a bit pattern in said color field.

27. An apparatus for converting an image frame into an encoded data stream comprising:

storing means used to store said image frame in a memory;

first associating means for associating a group of pixels with a region of said image frame;

first generating means for generating a first color distribution of said group of pixels associated with said region;

first testing means for testing said first color distribution to determine whether said group of pixels associated with said region has a homogeneous color distribution;

second associating means, operative when said group of pixels associated with said region has a homogeneous color distribution, for associating said region with a region color and encoding said group of pixels associated with said region as said region color;

means operative when said group of pixels associated with said region does not have a homogeneous color distribution for dividing said first color distribution into two or more second color distributions and testing at least one of said second color distributions to determine whether a group of pixels associated with said tested second color distribution has a homogeneous color distribution;

dividing means for dividing a tested second color distribution associated with a group of pixels that does not have a homogeneous distribution into two or more third color distributions;

second testing means for testing at least one of said third color distributions to determine whether a group of pixels associated with said tested third color distribution has a homogeneous color distribution;

merging means operative when at least one of said groups of pixels associated with said tested third color distributions has a homogeneous color distribution for performing the following operations:

if at least one of said groups of pixels associated with said tested second color distributions has a homogeneous color distribution, then merging said tested third color distribution associated with a group of pixels with a homogeneous color distribution with said tested second color distribution to form a first merged color distribution;

testing said first merged color distribution to determine whether a group of pixels associated with said first merged color distribution has a homogeneous color distribution;

if said group of pixels associated with said first merged color distribution has a homogeneous color distribution, associating said first merged color distribution with a first merged color distribution color and encoding a group of pixels associated with said first merged color distribution as said first merged distribution color;

if none of said groups of pixels associated with said tested second color distributions has a homogeneous color distribution, then testing a different third color distribution to determine whether a group of pixels associated with said tested different third color distribution has a homogeneous color distribution;

if a group of pixels associated with said different third color distribution has a homogeneous color distribution, then merging said tested third color distribution with said tested different third color distribution to form a second merged color distribution;

testing said second merged color distribution to determine whether a group of pixels associated with said second merged color distribution has a homogeneous color distribution;

if said group of pixels associated with said second merged color distribution has a homogeneous color distribution, associating said second merged color distribution with a second merged distribution color and encoding said group of pixels associated with said second merged color distribution as said second merged distribution color;

encoding means for encoding a group of pixels associated with a homogeneous color distribution.

* * * * *